(12) United States Patent
Okabe

(10) Patent No.: US 8,092,266 B2
(45) Date of Patent: Jan. 10, 2012

(54) MARINE VESSEL PROPULSION UNIT

(75) Inventor: Yoshihiko Okabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 203 days.

(21) Appl. No.: 12/621,532

(22) Filed: Nov. 19, 2009

(65) Prior Publication Data

US 2010/0130078 A1 May 27, 2010

(30) Foreign Application Priority Data

Nov. 21, 2008 (JP) .................................. 2008-297660
Mar. 2, 2009 (JP) .................................. 2009-047785

(51) Int. Cl.
*B63H 23/34* (2006.01)

(52) U.S. Cl. ........................................ 440/83; 464/68.1

(58) Field of Classification Search ..................... 440/75, 440/83; 464/24, 65.1, 68.3, 75, 88, 89, 93, 464/180, 27, 68.1

See application file for complete search history.

(56) References Cited

U.S. PATENT DOCUMENTS

| | | | | |
|---|---|---|---|---|
| 3,187,604 A | * | 6/1965 | Hazel | 74/573.12 |
| 4,148,200 A | * | 4/1979 | Schallhorn et al. | 464/68.3 |
| 5,050,446 A | * | 9/1991 | Takashima et al. | 464/180 |
| 6,119,840 A | * | 9/2000 | Dettmar | 192/70.17 |
| 6,342,012 B1 | * | 1/2002 | Dorok et al. | 464/93 |
| 6,547,613 B1 | | 4/2003 | Onoue et al. | |

* cited by examiner

*Primary Examiner* — Lars A Olson

(74) *Attorney, Agent, or Firm* — Keating & Bennett, LLP

(57) ABSTRACT

A marine vessel propulsion unit includes an engine, a drive shaft, a propeller shaft, a propeller, an intermediate shaft, a forward-reverse switching mechanism, and a shock reduction mechanism. The intermediate shaft is arranged on a central rotation axis of the propeller shaft. The intermediate shaft is arranged to transmit rotation between the drive shaft and the propeller shaft. The forward-reverse switching mechanism is arranged to switch a rotational direction of the propeller shaft to a forward drive direction or a reverse drive direction. The shock reduction mechanism includes a plurality of spring members and a pair of stopper portions. The shock reduction mechanism is arranged on the central rotation axis of the propeller shaft. The plurality of spring members are arranged to absorb a force in the rotational direction by elastically deforming in the rotational direction when the force in the rotational direction is applied to the intermediate shaft. The pair of stopper portions are arranged to prevent elastic deformations of the plurality of spring members by coming into contact with each other when the elastic deformation amounts of the plurality of spring members reach a predetermined value.

13 Claims, 14 Drawing Sheets

MARINE VESSEL PROPULSION UNIT

BACKGROUND OF THE INVENTION

1. Field of the Invention

The present invention relates to a marine vessel propulsion unit.

2. Description of Related Art

A prior art marine vessel propulsion unit is described in U.S. Pat. No. 6,547,613. The marine vessel propulsion unit includes a propeller shaft, a propeller to be rotated together with the propeller shaft, and a forward-reverse switching mechanism which applies a driving force from an engine to the propeller shaft and rotates the propeller shaft in a forward drive direction or a reverse drive direction. The propeller shaft includes a drive shaft and a driven shaft extending in the front/rear direction.

The drive shaft and the driven shaft are joined by engagement between a plurality of drive teeth provided on the drive shaft and a plurality of driven teeth provided on the driven shaft. The plurality of drive teeth are arranged to be slidable in the front/rear direction along the drive shaft. Also, the plurality of driven teeth are fixed to the driven shaft. The plurality of drive teeth are urged rearward from the front side by a spring member. The plurality of drive teeth are pressed against the plurality of driven teeth by an urging force of the spring member.

The plurality of drive teeth move forward along the drive shaft against the urging force of the spring member while sliding on the plurality of driven teeth when a torque (shock) is applied to the drive shaft by the forward-reverse switching mechanism. In other words, the force (shock) in a rotational direction applied to the drive shaft is converted into a force in the front/rear direction by the plurality of drive teeth and the plurality of driven teeth. Accordingly, the plurality of drive teeth move forward along the drive shaft. Then, the spring member supporting the plurality of drive teeth from the front side is compressed and the shock applied to the propeller shaft is absorbed.

SUMMARY OF THE INVENTION

The inventor of the preferred embodiments of the present invention described and claimed in the present application conducted an extensive study and research regarding the design and development of a marine vessel propulsion unit, and in doing so, discovered and first recognized new unique challenges and previously unrecognized possibilities for improvements as described in greater detail below.

That is, in the marine vessel propulsion unit according to the above-described prior art, when a shock applied to the propeller shaft is absorbed, the plurality of drive teeth move forward along the drive shaft while sliding on the plurality of driven teeth. Therefore, the plurality of drive teeth and the plurality of driven teeth may be worn away. Also, if the plurality of drive teeth and the plurality of driven teeth are worn away, the life of a mechanism arranged to reduce the shock, including the plurality of drive teeth and the plurality of driven teeth, will be shortened.

Further, in the marine vessel propulsion unit according to the prior art described above, the rotational direction of the propeller shaft may be switched by the forward-reverse switching mechanism while the propeller shaft rotates. In this case, as compared with the case in which the rotational direction of the propeller shaft is switched while the propeller shaft does not rotate, the shock applied to the propeller shaft becomes greater. However, the marine vessel propulsion unit includes only one spring member arranged to absorb the shock. Therefore, the shock applied to the propeller shaft may not be sufficiently absorbed.

In the marine vessel propulsion unit according to the prior art described above, when propelling the hull, resistance from water is applied to the propeller. Therefore, when propelling the hull, a high torque must be applied to the propeller. However, in the marine vessel propulsion unit, the plurality of drive teeth are supported by the spring member. Therefore, there is a possibility that the torque applied to the propeller shaft is absorbed by the spring member and a high torque is not transmitted to the propeller.

In order to overcome the previously unrecognized and unsolved challenges described above, a preferred embodiment of the present invention provides a marine vessel propulsion unit including an engine, a drive shaft, a propeller shaft, a propeller, an intermediate shaft, a forward-reverse switching mechanism, and a shock reduction mechanism. The drive shaft is arranged to be rotated by the engine. The rotation of the drive shaft is transmitted to the propeller shaft. The propeller is arranged to be rotated together with the propeller shaft. The intermediate shaft is arranged on a central rotation axis of the propeller shaft. The intermediate shaft is arranged to transmit rotation between the drive shaft and the propeller shaft. The forward-reverse switching mechanism is arranged to switch a rotational direction of the propeller shaft to a forward drive direction or a reverse drive direction. The shock reduction mechanism includes a plurality of spring members and a pair of stopper portions. The shock reduction mechanism is arranged on the central rotation axis of the propeller shaft. The plurality of spring members are arranged to absorb a force in the rotational direction by elastically deforming in the rotational direction when the force in the rotational direction is applied to the intermediate shaft. The pair of stopper portions are arranged to prevent elastic deformations of the plurality of spring members by coming into contact with each other when the elastic deformation amounts of the plurality of spring members reach a predetermined value.

In addition, the phrase "central rotation axis of the propeller shaft" above refers to an axis passing through the propeller shaft. Also, the phrase "arranged on the central rotation axis of the propeller shaft" includes an arrangement inside or around the propeller shaft and an arrangement at a position spaced apart from the propeller shaft along the central rotation axis.

With this arrangement, the drive shaft is rotated by the engine, and the rotation of the drive shaft is transmitted to the intermediate shaft. Then, the rotation of the intermediate shaft is transmitted to the propeller shaft, and the propeller shaft and the propeller rotate integrally. Accordingly, a propulsion force is generated. Therefore, when the rotational direction of the propeller shaft is set to the forward drive direction by the forward-reverse switching mechanism, a propulsion force to propel the hull forward is generated. Also, when the rotational direction of the propeller shaft is set to the reverse drive direction by the forward-reverse switching mechanism, a propulsion force to propel the hull backward is generated. Also, a shock which is applied to the propeller shaft when switching the rotational direction of the propeller shaft by the forward-reverse switching mechanism is reduced and minimized by the shock reduction mechanism.

In detail, for example, when switching the rotational direction of the propeller shaft by the forward-reverse switching mechanism, a shock in the rotational direction may be applied to the intermediate shaft and this shock may be transmitted to the propeller shaft. The shock in the rotational direction to be applied to the intermediate shaft at this time is absorbed by elastic deformations of the plurality of spring members. Accordingly, the shock to be applied to the propeller shaft is reduced and minimized by the shock reduction mechanism. Also, the shock is absorbed by the elastic deformations of the plurality of spring members, such that wearing of the members provided with the shock reduction mechanism is reduced and minimized as compared with the marine vessel propulsion unit according to the prior art described above. Accordingly, the life of the shock reduction mechanism is improved. Further, the plurality of spring members are arranged such that even when a great shock is applied to the intermediate shaft, the shock is reliably absorbed. Furthermore, when the elastic deformation amounts of the spring members reach a predetermined value, the pair of stopper portions come into contact with each other and prevent the elastic deformations of the spring members. Therefore, after the pair of stopper portions come into contact with each other, a torque applied to the intermediate shaft is transmitted to the propeller shaft without being absorbed by the plurality of spring members. Accordingly, a high torque is transmitted to the propeller.

Each of the spring members may be arranged to absorb the force in the rotational direction whether the force in the rotational direction applied to the intermediate shaft is in a clockwise direction or in a counterclockwise direction.

Also, the shock reduction mechanism may include first and second relative rotation members arranged to rotate relatively in the rotational direction when the force in the rotational direction is applied to the intermediate shaft. In this case, the plurality of spring members may be provided between the first and second relative rotation members and arranged to be compressed according to relative rotations of the first and second relative rotation members.

Also, the shock reduction mechanism may include a first housed member and a second housed member. The first housed member may be arranged to support one side of each of the spring members. The second housed member may be arranged to support the other side of each of the spring members. The first and second housed member may be housed in the second relative rotation member. The first and second housed members may be arranged to approach each other according to relative rotations of the first and second relative rotation members. Also, the spring members may be arranged to be compressed in the rotational direction by the first and second housed members according to approaching of the first and second housed members to each other.

Also, the first relative rotation member may include a projection, and the second relative rotation member may include a support portion. In this case, the projection may be arranged to press the first housed member in one rotational direction when the first and second relative rotation members rotate relatively in the one rotational direction. Further, the projection may be arranged to press the second housed member in the other rotational direction when the first and second relative rotation members rotate relatively in the other rotational direction. Also, the support portion maybe arranged to support the first and second housed members so as to prevent rotation in the other rotational direction of the first housed member and rotation in the one rotational direction of the second housed member.

Also, the first relative rotation member may include a rotating member, and the second relative rotation member may include a fixed member prevented from rotating.

Also, the first relative rotation member may include a first rotating member integrally joined to the intermediate shaft, and the second relative rotation member may include a second rotating member integrally joined to the propeller shaft.

Also, the plurality of spring members may include compression coil springs.

Also, the marine vessel propulsion unit may further include a reduction gear mechanism. The reduction gear mechanism maybe arranged on the central rotation axis of the propeller shaft and be arranged to decelerate rotation of the intermediate shaft so as to transmit the decelerated rotation to the propeller shaft. In this case, the reduction gear mechanism and the shock reduction mechanism may be provided between the intermediate shaft and the propeller shaft.

Also, the reduction gear mechanism may include a planetary gear mechanism.

Also, the planetary gear mechanism may include a sun gear. In this case, the sun gear may include a spring receiving portion arranged to extend radially and support the spring members on one side and the other side of a circumferential direction of the sun gear.

Also, the plurality of spring members may include a first compression coil spring supported on one side of the spring receiving portion and a second compression coil spring supported on the other side of the spring receiving portion.

Also, the first and second compression coil springs may have spring constants different from each other.

Also, the shock reduction mechanism may further include an orifice. In this case, the orifice may be arranged to cause oil in a space accommodating each of the spring members to flow out when each of the spring members is compressed. Further, the orifice may be arranged to cause oil to flow into the space accommodating each of the spring members when each of the spring members is expanded.

Also, the propeller shaft and the intermediate shaft may include an oil passage arranged to supply oil to at least the orifice.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

First, an arrangement of an outboard motor according to a first preferred embodiment of the present invention will be described with reference to FIG. 1 to FIG. 6. FWD in the figures indicates a forward drive direction of the marine vessel, and BWD in the figures indicates a reverse drive direction of the marine vessel.

Figure 1:
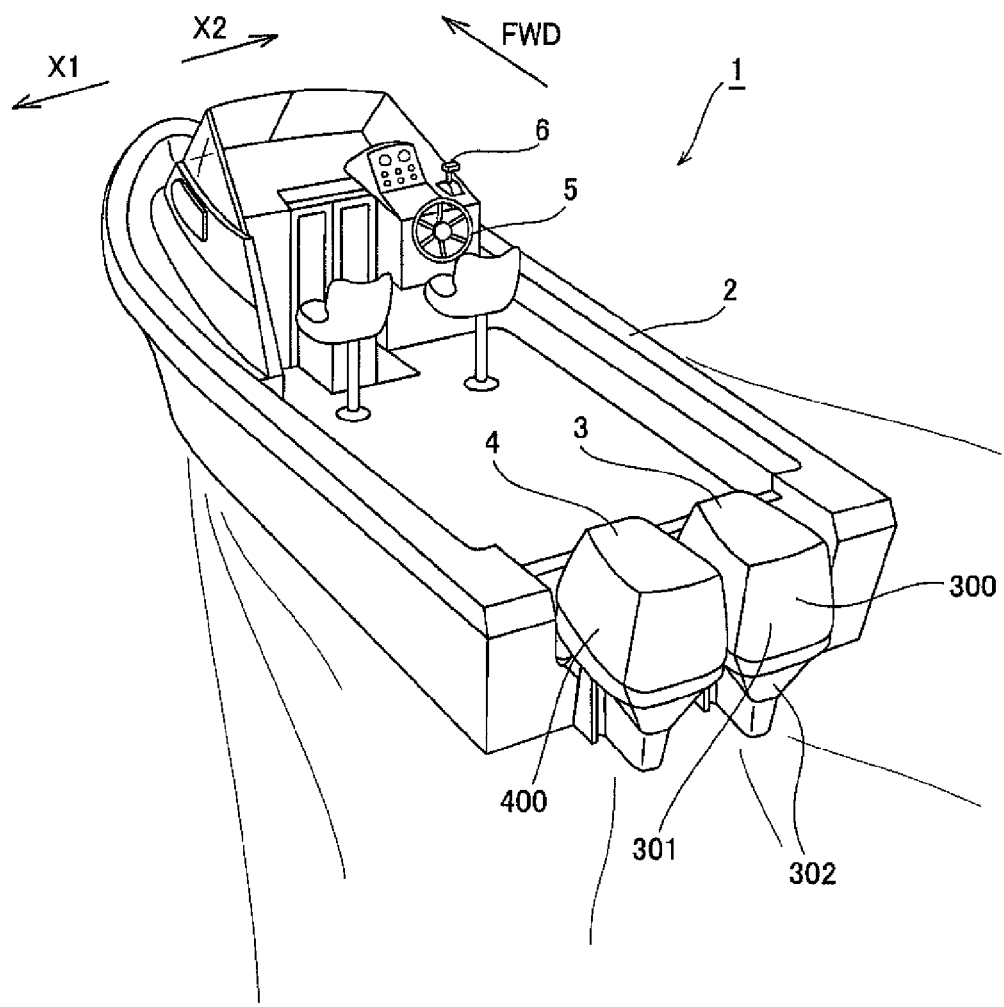
FIG. 1 is a perspective view of a marine vessel equipped with an outboard motor according to a first preferred embodiment of the present invention.

FIG. 1 is a perspective view of a marine vessel equipped with an outboard motor according to a first preferred embodiment of the present invention.

The marine vessel 1 includes a hull 2 floating on the water surface, two outboard motors 3 and 4 attached to the rear portion of the hull 2, a steering portion 5 for steering the hull 2, and a control lever portion 6 arranged in the vicinity of the steering portion 5. The hull 2 is propelled forward or backward by the two outboard motors 3 and 4. Forward driving and reverse driving of the hull 2 are switched by operating the control lever portion 6. The outboard motors 3 and 4 are an example of the "marine vessel propulsion unit" according to a preferred embodiment of the present invention. It should be noted that any number of outboard motors can be used in the present invention.

The two outboard motors 3 and 4 are arranged symmetrically about the center in the lateral direction (the arrow X1 direction and the arrow X2 direction) of the hull 2. Also, the outboard motors 3 and 4 are covered by cases 300 and 400, respectively. The cases 300 and 400 are made of, for example, a resin or a metal. The cases 300 and 400 protect the interiors of the outboard motors 3 and 4 from water, etc., respectively.

Figure 2:
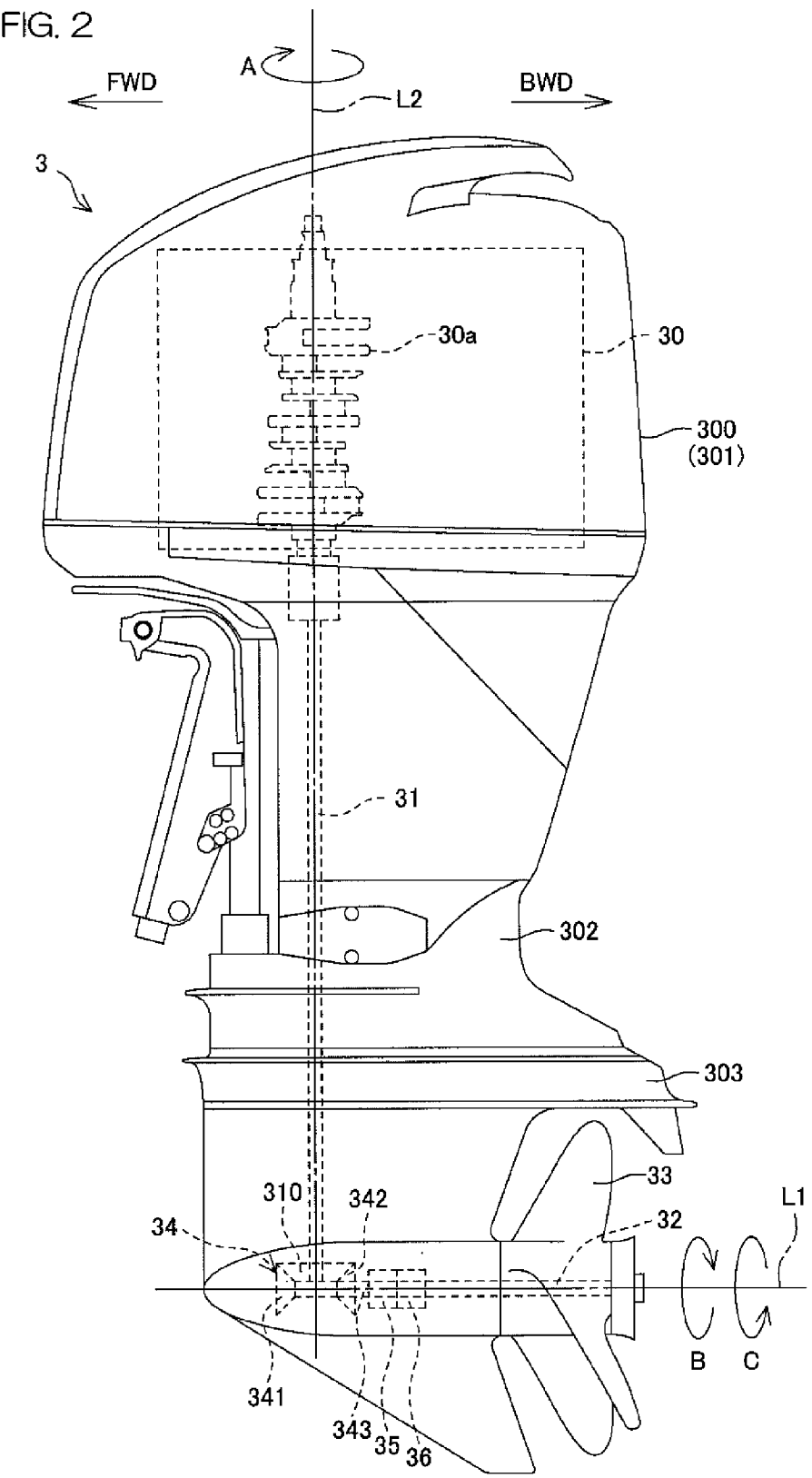
FIG. 2 is an external view for describing an arrangement of the outboard motor according to the first preferred embodiment of the present invention.

FIG. 2 is an external view for describing an arrangement of the outboard motor according to the first preferred embodiment of the present invention.

The outboard motor 3 includes an engine 30, a drive shaft 31, a propeller shaft 32, and a propeller 33. The drive shaft 31 extends up and down below the engine 30. The drive shaft 31 is rotated by the engine 30. Also, the propeller shaft 32 extends in a direction crossing (for example, perpendicular or substantially perpendicular to) the drive shaft 31. The propeller 33 is integrally joined to the rear end portion of the propeller shaft 32.

Also, the outboard motor 3 includes an intermediate shaft 343, a forward-reverse switching mechanism 34, a planetary gear mechanism 35, and a shock reduction mechanism 36. The intermediate shaft 343 extends along a central rotation axis L1 of the propeller shaft 32 in front of the propeller shaft 32. The rotation of the drive shaft 31 is transmitted to the intermediate shaft 343 by the forward-reverse switching mechanism 34. Also, the rotation of the intermediate shaft 343 is decelerated by the planetary gear mechanism 35 and transmitted to the propeller shaft 32. The planetary gear mechanism 35 is an example of "a reduction gear mechanism" according to a preferred embodiment of the present invention.

The forward-reverse switching mechanism 34 is provided on the downstream side of the drive shaft 31. "Downstream side" indicates the downstream side in a driving force transmission path from the engine 30 to the propeller 33. The engine 30 side in the transmission path is the upstream side, and the propeller 33 side in the transmission path is the downstream side. The forward-reverse switching mechanism 34 is arranged to rotate the propeller shaft 32 in the forward drive direction or the reverse drive direction by switching the rotational direction of the intermediate shaft 343. Also, the planetary gear mechanism 35 and the shock reduction mechanism 36 are arranged on the central rotation axis L1 of the propeller shaft 32. The planetary gear mechanism 35 and the shock reduction mechanism 36 are provided between the intermediate shaft 343 and the propeller shaft 32.

Also, the case 300 includes an engine cover 301, an upper case 302, and a lower case 303. The engine 30 is housed in the engine cover 301. The engine 30 includes a crankshaft 30a which rotates in the direction A about the axis L2 (vertical axis). The direction A is, for example, clockwise as viewed from above. The crankshaft 30a is arranged along the axis L2. Also, the drive shaft 31 is arranged along the axis L2 below the crankshaft 30a. The lower end portion of the crankshaft 30a is connected to the upper end portion of the drive shaft 31. The drive shaft 31 is arranged to rotate in the direction A together with the crankshaft 30a. The drive shaft 31 is housed in the upper case 302 and the lower case 303.

Figure 3:
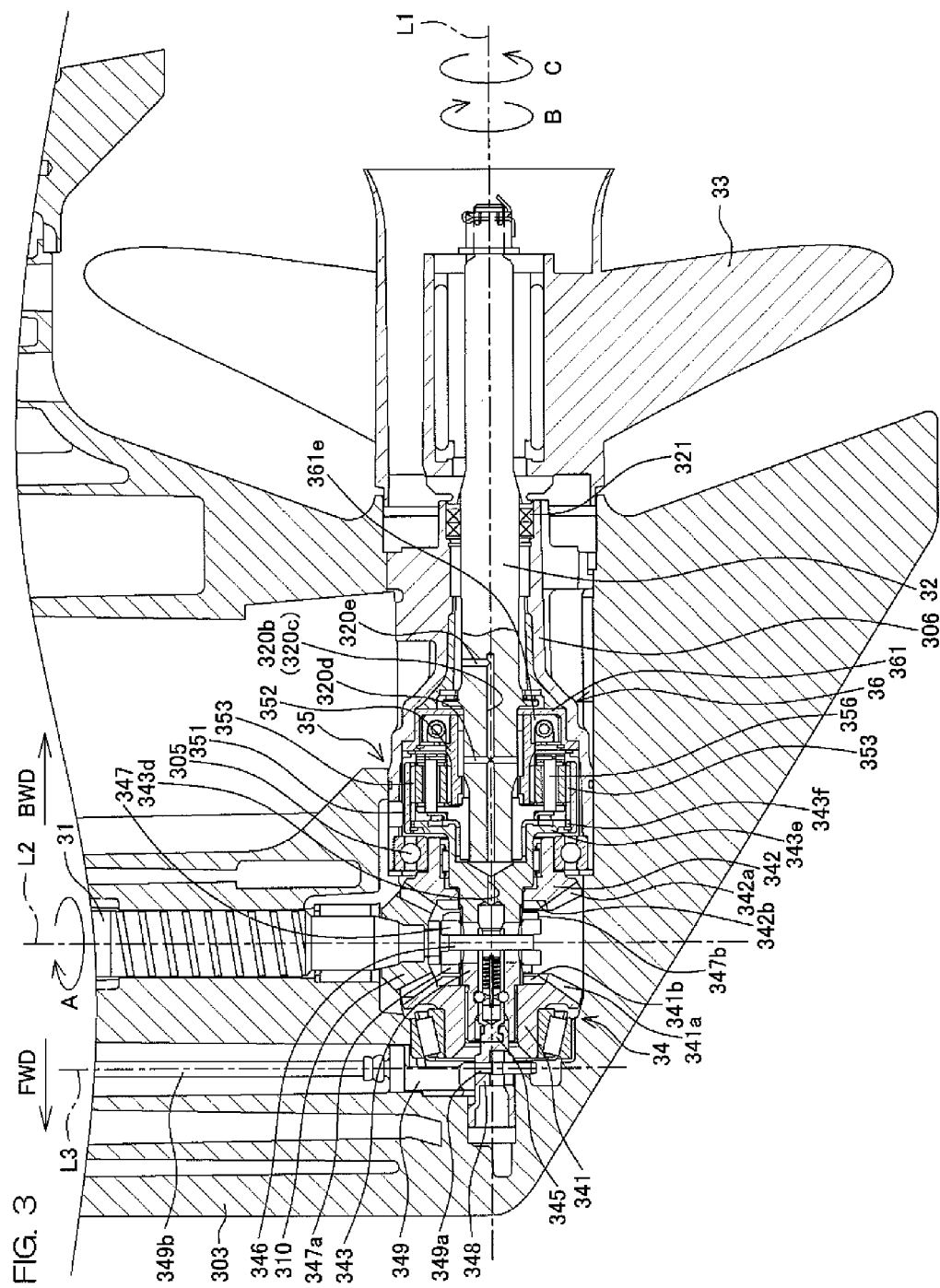
FIG. 3 is a sectional view for describing an arrangement inside a lower case of the outboard motor according to the first preferred embodiment of the present invention.

FIG. 3 is a sectional view for describing an arrangement inside the lower case of the outboard motor according to the first preferred embodiment of the present invention.

A bevel gear 310 is attached to the lower end portion of the drive shaft 31 so as to rotate in the direction A together with the drive shaft 31. The bevel gear 310 is arranged to transmit a driving force to the forward-reverse switching mechanism 34. In detail, the forward-reverse switching mechanism 34 includes a front bevel gear 341 and a rear bevel gear 342 arranged in the rear of the front bevel gear 341. The front bevel gear 341 and the rear bevel gear 342 include a gear portion 341a and a gear portion 342a, respectively. The bevel gear 310 is engaged with the gear portion 341a and the gear portion 342a.

The front bevel gear 341 is arranged to be rotated in the direction B about the central rotation axis L1 of the propeller shaft 32 according to rotation in the direction A of the bevel gear 310. Also, the rear bevel gear 342 is arranged to be rotated in the direction C opposite to the direction B about the central rotation axis L1 of the propeller shaft 32 according to the rotation in the direction A of the bevel gear 310. The direction B is, for example, clockwise when the propeller shaft 32 is viewed from the rear side (the arrow BWD direction side) of the outboard motor 3. Also, the direction C is, for example, counterclockwise when the propeller shaft 32 is viewed from the rear side of the outboard motor 3.

The gear ratio of the bevel gear 310 to the front bevel gear 341 is, for example, approximately 1.75. Therefore, the rotation of the bevel gear 310 is decelerated and transmitted to the front bevel gear 341. Also, the gear ratio of the bevel gear 310 to the rear bevel gear 342 is equal to, for example, the gear ratio (approximately 1.75) of the bevel gear 310 to the front bevel gear 341. Therefore, the rotation of the bevel gear 310 is decelerated and transmitted to the rear bevel gear 342.

Figure 4:
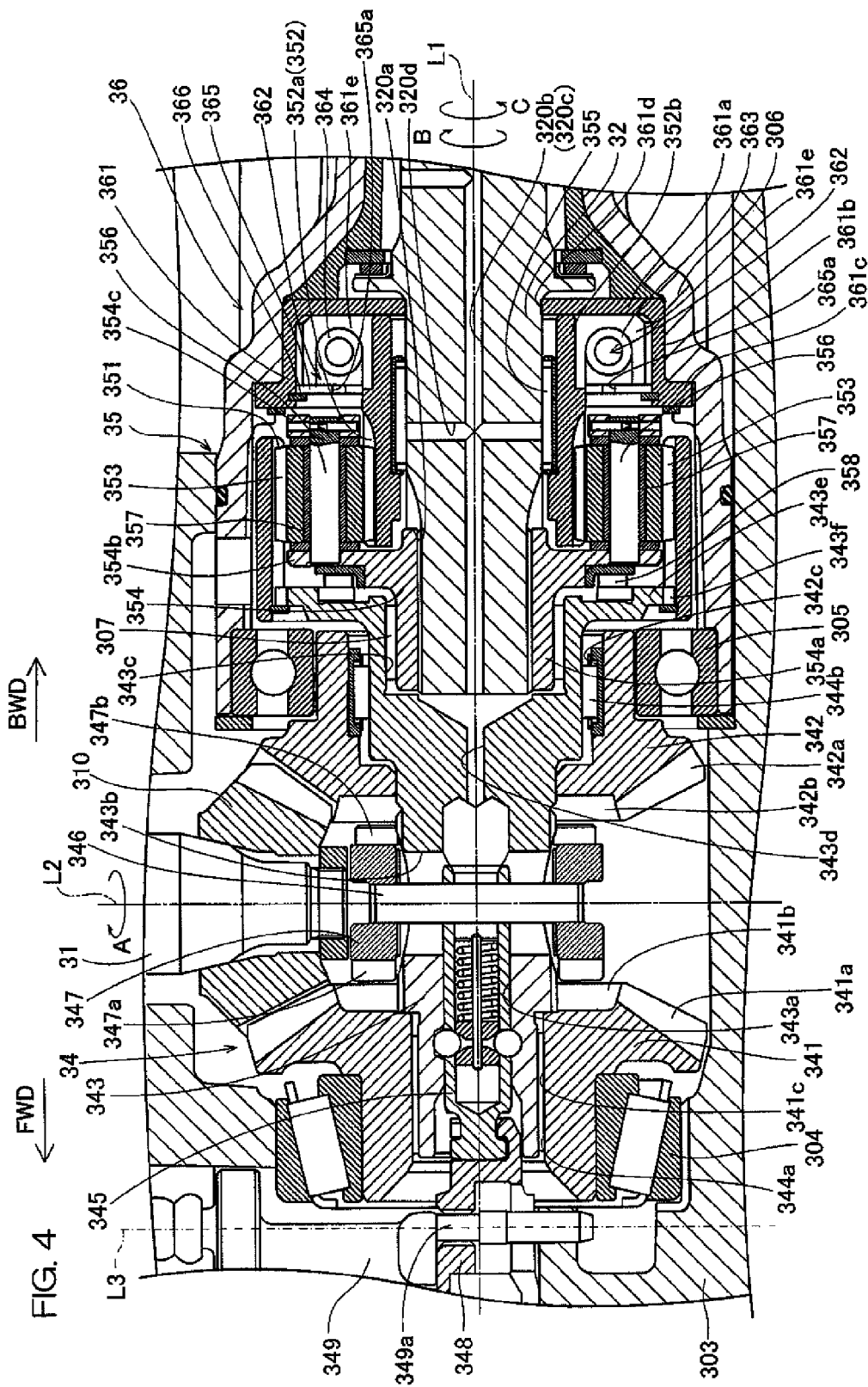
FIG. 4 is a sectional view for describing arrangements of a forward-reverse switching mechanism and a shock reduction mechanism of the outboard motor according to the first preferred embodiment of the present invention.

FIG. 4 is a sectional view for describing arrangements of the forward-reverse switching mechanism and the shock reduction mechanism of the outboard motor according to the first preferred embodiment of the present invention.

The front bevel gear 341 includes a dog portion 341b positioned on the central rotation axis L1 side of the gear portion 341a. A front dog 347a of a dog clutch 347 described later is engaged with the dog portion 341b. Also, the front bevel gear 341 is fitted into a bearing 304. The bearing 304 is, for example, a tapered bearing (e.g., a conical roll bearing). The bearing 304 is fixed to the lower case 303. The bearing 304 is arranged to stably support the front bevel gear 341 even when the front bevel gear 341 is rotated about the central rotation axis L1.

Also, the rear bevel gear 342 includes a dog portion 342b positioned on the central rotation axis L1 side of the gear portion 342a. A rear dog 347b of a dog clutch 347 described later is engaged with the dog portion 342b. Also, the rear bevel gear 342 is fitted into a bearing 305. The bearing 305 is fixed to the lower case 303 via a housing 306. The bearing 305 is arranged to stably support the rear bevel gear 342 even when the rear bevel gear 342 is rotated about the central rotation axis L1.

Also, the intermediate shaft 343 is arranged below the bevel gear 310. The intermediate shaft 343 extends in the front/rear direction (the arrow FWD direction and the arrow BWD direction). The intermediate shaft 343 is arranged on the central rotation axis L1. The intermediate shaft 343 is arranged to be rotatable about the central rotation axis L1. The front end portion of the intermediate shaft 343 is inserted in an open hole 341c provided in the front bevel gear 341. The open hole 341c extends along the central rotation axis L1. Also, a rear portion of the intermediate shaft 343 is inserted in an open hole 342c provided in the rear bevel gear 342. The open hole 342c extends along the central rotation axis L1.

A bushing 344a is fitted to the inner peripheral surface of the open hole 341c provided in the front bevel gear 341. The intermediate shaft 343 is arranged to idle with respect to the front bevel gear 341. Also, a bearing 344b is fitted to the inner peripheral surface of the open hole 342c provided in the rear bevel gear 342. The intermediate shaft 343 is arranged to idle with respect to the rear bevel gear 342.

Also, the intermediate shaft 343 includes an insertion hole 343a extending backward from the front end of the intermediate shaft 343 along the central rotation axis L1, and a through hole 343 provided in an intermediate portion of the intermediate shaft 343. The through hole 343 extends in a direction perpendicular or substantially perpendicular to the central rotation axis L1. The insertion hole 343a and the through hole 343 cross at right angles. The through hole 343b has a slotted hole shape long in the front/rear direction.

Also, a cylindrical slide member 345 is inserted in the insertion hole 343a slidably in the front/rear direction. The rear end portion of the slide member 345 is positioned inside the through hole 343b. The rear end portion of the slide member 345 is joined to a bar-shaped joint member 346. The slide member 345 and the joint member 346 are joined so as to be perpendicular or substantially perpendicular to each other. When the slide member 345 is slid in the front/rear direction along the insertion hole 343a, the joint member 346 is slid in the front/rear direction inside the through hole 343b.

Also, the joint member 346 penetrates through the through hole 343b vertically. The upper end portion and the lower end portion of the joint member 346 project to the outside from the outer peripheral surface of the intermediate shaft 343, respectively. To both end portions of the joint member 346, a tubular dog clutch 347 is fixed. The dog clutch 347 surrounds the outer peripheral surface of the intermediate shaft 343. The dog clutch 347 is spline-engaged with the outer peripheral surface of the intermediate shaft 343. The dog clutch 347 is arranged to rotate about the central rotation axis L1 together with the joint member 346. Further, the dog clutch 347 is arranged to be slidable in the front/rear direction with respect to the intermediate shaft 343.

The dog clutch 347 includes a front dog 347a provided on an end portion on the arrow FWD direction side of the dog clutch 347 and a rear dog 347b provided on an end portion on the arrow BWD direction side of the dog clutch 347. When the dog clutch 347 is slid in the arrow FWD direction, the front dog 347a is engaged with the dog portion 341b of the front bevel gear 341. Also, when the dog clutch 347 is slid in the arrow BWD direction, the rear dog 347b is engaged with the dog portion 342b of the rear bevel gear 342. Also, when the dog clutch 347 is arranged at an intermediate position between the front bevel gear 341 and the rear bevel gear 342, the front dog 347a and the rear dog 347b are spaced apart from the dog portion 341b and the dog portion 342b, respectively.

The rotation in the direction B (forward drive direction) about the central rotation axis L1 of the front bevel gear 341 is transmitted to the intermediate shaft 343 by engagement of the dog clutch 347 with the front bevel gear 341. Also, the rotation in the direction C (reverse drive direction) about the central rotation axis L1 of the rear bevel gear 342 is transmitted to the intermediate shaft 343 by engagement of the dog clutch 347 with the rear bevel gear 342. Also, when the dog clutch 347 is arranged at an intermediate position between the front bevel gear 341 and the rear bevel gear 342, the transmission of the rotation from the drive shaft 31 to the intermediate shaft 343 is cut off.

Also, the front end portion of the slide member 345 is joined to the joint member 348. A joint member 348 is engaged with a protrusion 349a of a forward-reverse switching lever 349. The forward-reverse switching lever 349 is connected to an actuator not shown arranged inside the engine cover 301 (see FIG. 2) via an interlocking mechanism 349b (see FIG. 3). The forward-reverse switching lever 349 is rotated around the axis L3 by the actuator. The protrusion 349a is moved in the front/rear direction according to rotating of the forward-reverse switching lever 349. Also, the joint member 348 is moved in the front/rear direction according to the movement in the front/rear direction of the protrusion 349a. The slide member 345 is moved in the front/rear direction according to the movement in the front/rear direction of the joint member 348. Therefore, by rotating the forward-reverse switching lever 349 by the actuator, the dog clutch 347 is slid in the front/rear direction with respect to the intermediate shaft 343.

Also, the intermediate shaft 343 includes a recess 343c provided on the rear end portion of the intermediate shaft 343. The recess 343c is positioned on the central rotation axis L1 side on the rear end portion of the intermediate shaft 343. The recess 343c extends forward from the rear end of the intermediate shaft 343. The recess 343c is arranged to allow the front end portion of the propeller shaft 32 and the front end portion of a carrier 354 of the planetary gear mechanism 35 to be inserted therein. Also, the recess 343c has a tubular inner peripheral surface. On the inner peripheral surface of the recess 343c, a bush 307 is arranged. The bush 307 functions as an oscillation stopper for the carrier 354 of the planetary gear mechanism 35.

Also, in a bottom portion (portion on the arrow FWD direction side) of the recess 343c, an oil passage 343d extending along the central rotation axis L1 is provided. The oil passage 343d communicates with an insertion hole 343a provided in the intermediate shaft 343. Oil supplied into the oil passage 343d is supplied to the planetary gear mechanism 35 and the shock reduction mechanism 36, etc., via an oil passage 320b provided in the propeller shaft 32.

Also, on the outer peripheral portion of the rear end portion of the intermediate shaft 343, a flange portion 343e extending in a direction crossing (for example, orthogonal to) the extending direction of the intermediate shaft 343 (the arrow FWD direction and the arrow BWD direction) is provided. Also, on the outer peripheral portion of the flange portion 343e, a tubular engagement portion 343f is provided. The engagement portion 343f is engaged with a ring gear 351 of the planetary gear mechanism 35. The rotation of the intermediate shaft 343 is transmitted to the ring gear 351 of the planetary gear mechanism 35 by the engagement portion 343f.

Also, the planetary gear mechanism 35 is housed in a housing 306 attached to the lower case 303. The planetary gear mechanism 35 surrounds the front end portion of the propeller shaft 32. A driving force applied to the intermediate shaft 343 is transmitted to the planetary gear mechanism 35. The planetary gear mechanism 35 is arranged to decelerate the rotation of the intermediate shaft 343 and transmit it to the propeller shaft 32 when propelling the hull 2 forward and when propelling the hull backward. Therefore, the outboard motor 3 is arranged to decelerate the rotation of the drive shaft 31 by both of the engagement portion between the bevel gear 310 and the front bevel gear 341 or the rear bevel gear 342 and the planetary gear mechanism 35.

The reduction gear ratio of the planetary gear mechanism 35 is, for example, approximately 1.55. Also, as described above, the reduction gear ratio of the bevel gear 310 to the front bevel gear 341 and the reduction gear ratio of the bevel gear 310 to the rear bevel gear 342 are, for example, approximately 1.75. Therefore, the rotation of the drive shaft 31 is decelerated to approximately 1/(1.55×1.75), that is, approximately 1/2.71 and transmitted to the propeller shaft 32, for example.

Next, a detailed structure of the planetary gear mechanism 35 will be described with reference to FIG. 4 and FIG. 5.

Figure 5:
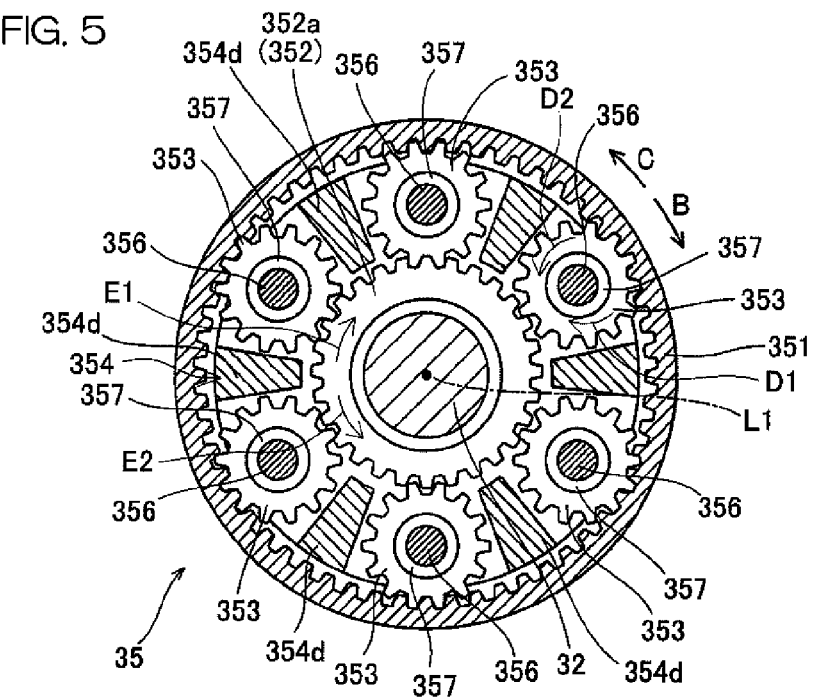
FIG. 5 is a sectional view for describing an arrangement of a planetary gear mechanism according to the first preferred embodiment of the present invention.

FIG. 5 is a sectional view for describing an arrangement of the planetary gear mechanism according to the first preferred embodiment of the present invention.

The planetary gear mechanism 35 includes a ring gear 351, a sun gear 352, a plurality (for example, six) of planetary gears 353, and a carrier 354. The ring gear 351 surrounds the propeller shaft 32 coaxially. The sun gear 352 surrounds the propeller shaft 32 coaxially at the inner side of the ring gear 351. The sun gear 352 is joined to the propeller shaft 32 via a bearing 355 relatively rotatably. Also, the planetary gears 353 are arranged by being spaced from each other in the circumferential direction between the ring gear 351 and the sun gear 352. The planetary gears 353 are engaged with both of the ring gear 351 and the sun gear 352. The carrier 354 supports the planetary gears 353 rotatably (rotatably on their own axes). The carrier 354 surrounds the propeller shaft 32 coaxially.

As shown in FIG. 4, the ring gear 351 is engaged with the engagement portion 343f of the intermediate shaft 343. The ring gear 351 is arranged to be rotated according to rotation of the intermediate shaft 343. Also, the sun gear 352 includes a gear portion 352a which engages with the planetary gears 353. As shown in FIG. 4, the gear portion 352a is provided on a front portion of the sun gear 352. A rear portion of the sun gear 352 is held so as to be rotatable in a range of a predetermined angle with respect to the stator 361 of the shock reduction mechanism 36 described later. The rear portion of the sun gear 352 constitutes a portion of the shock reduction mechanism 36. The sun gear 352 is an example of "a first relative rotation member" and "a rotating member" according to a preferred embodiment of the present invention.

Also, each planetary gear 353 preferably has, for example, a tubular shape. Six shaft members 356 are inserted through the inner peripheries of the six planetary gears 353, respectively, although the number can different than six. Between each shaft member 356 and a corresponding planetary gear 353, a bearing 357 is arranged. Accordingly, each planetary gear 353 is arranged to be rotatable in the direction D1 and the direction D2 around the corresponding shaft member 356. The six shaft members 356 are fixed to the carrier 354, respectively.

Also, as shown in FIG. 4, the carrier 354 includes a tubular portion 354a, annular flange portion 354b and flange portion 354c arranged by being spaced from each other in the front/rear direction, and a plurality of columns 354d. The tubular portion 354a surrounds the propeller shaft 32 coaxially. The tubular portion 354a is integrally joined to the propeller shaft 32 by a spline, for example. Also, the flange portion 354b projects in a direction perpendicular or substantially perpendicular to the tubular portion 354a from the outer peripheral surface of the tubular portion 354a. The flange portion 354b is joined to the flange portion 343e of the intermediate shaft 343 via a thrust bearing 358 relatively rotatably. The flange portion 354b and the flange portion 354c are opposed to each other across six planetary gears 353 sandwiched therebetween. One end portion and the other end portion of each shaft member 356 are fixed to the flange portion 354b and the flange portion 354c, respectively. The flange portion 354b and the flange portion 354c are coupled by the plurality of columns 354d.

Also, the rear end portion of the tubular portion 354a of the carrier 354 is prevented from moving backward. In detail, as shown in FIG. 4, on the rear end portion of the portion to which the carrier 354 is fitted of the propeller shaft 32, a stepped portion 320a is provided. When propelling the hull 2 (see FIG. 1) forward, a propulsion force generated by the propeller 33 (force in the arrow FWD direction) is applied to the propeller shaft 32. At this time, the tubular portion 354a of the carrier 354 is pressed forward (the arrow FWD direction) by the stepped portion 320a. Therefore, the carrier 354 is prevented from moving backward by engagement with the stepped portion 320a.

Each planetary gear 353 rotates on its own axis in the direction D1 or the direction D2 around the shaft member 356 according to rotation in the direction B or the direction C of the ring gear 351. Also, each planetary gear 353 revolves in the direction E1 (the forward drive direction) or the direction E2 (the reverse drive direction) about the central rotation axis L1 around the sun gear 352 while rotating on its own axis. Each shaft member 356 rotates in the direction E1 or the direction E2 about the central rotation axis L1 around the sun gear 352 according to the revolution of the planetary gear 353.

When the six shaft members 356 rotate in the direction E1 (forward drive direction) or the direction E2 (reverse drive direction) around the sun gear 352, the rotations of the six shaft members 356 are transmitted to the carrier 354. Accordingly, the carrier 354 is rotated in the direction B (forward drive direction) or the direction C (reverse drive direction). Also, when the carrier 354 rotates in the direction B or the direction C, the propeller shaft 32 rotates in the direction B or the direction C together with the carrier 354.

Next, the shock reduction mechanism 36 will be described in detail with reference to FIG. 4 and FIG. 6.

Figure 6:
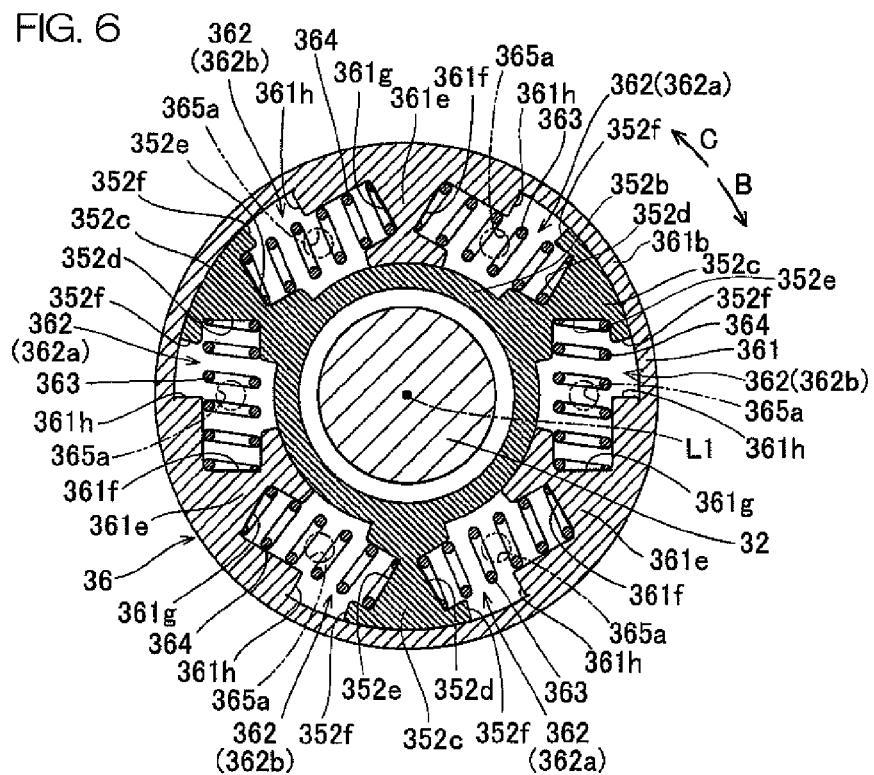
FIG. 6 is a sectional view for describing an arrangement of a shock reduction mechanism according to the first preferred embodiment of the present invention.

FIG. 6 is a sectional view for describing an arrangement of the shock reduction mechanism according to the first preferred embodiment of the present invention.

As shown in FIG. 4, the shock reduction mechanism 36 is provided in the rear of the planetary gear 353. The shock reduction mechanism 36 is arranged to reduce a shock to be applied to the sun gear 352. A rear portion of the sun gear 352 includes a cylindrical portion 352b (see FIG. 4) and a plurality (for example, three) of spring receiving portions 352c (see FIG. 6). The cylindrical portion 352b extends backward from the gear portion 352a of the sun gear 352. Also, three spring receiving portions 352c project radially outward from the cylindrical portion 352b, respectively. The three spring receiving portions 352c are arranged, for example, at even intervals in the circumferential direction.

As shown in FIG. 4, the rear portion of the sun gear 352 is housed inside the stator 361. The stator 361 is an example of "a second relative rotation member" and "a fixed member" according to a preferred embodiment of the present invention. The rear portion of the sun gear 352 is held on the stator 361 so as to be rotatable in a predetermined angle range in the direction B and the direction C about the central rotation axis L1 with respect to stator 361. Therefore, the sun gear 352 is arranged to be rotatable in the predetermined angle range in the direction B and the direction C about the central rotation axis L1 with respect to the stator 361.

Also, as shown in FIG. 4, a stator 361 is housed in the housing 306. The stator 361 includes a disk portion 361a, a cylindrical outer peripheral portion 361b, and an annular flange portion 361c. The disk portion 361a is arranged perpendicular or substantially perpendicular to the central rotation axis L1. The propeller shaft 32 is inserted through a through hole 361d provided at the central portion of the disk portion 361a. Also, the outer peripheral portion 361b extends in the arrow FWD direction from the outer peripheral portion of the disk portion 361a. Also, the flange portion 361c projects to the outside from the front end portion of the outer peripheral portion 361b. The stator 361 is prevented from moving with respect to the housing 306 by engagement of the housing 306 with the outer peripheral portion 361b and the flange portion 361c.

Also, as shown in FIG. 6, the stator 361 includes a plurality (for example, three) of spring receiving portions 361e. The three spring receiving portions 361e project radially inward from the outer peripheral portion 361b of the stator 361, respectively. The three spring receiving portions 361e are arranged at even intervals in the circumferential direction, for example. The three spring receiving portions 361e provided on the stator 361 and the three spring receiving portions 352c provided on the sun gear 352 are arranged alternately by being spaced from each other in the circumferential direction. Therefore, between these spring receiving portions 361e and 352c, six spaces 362 are provided. The six spaces 362 include three one-side spaces 362a positioned on the direction B sides of the spring receiving portions 361e (the direction C sides of the spring receiving portions 352c) and three other-side spaces 362b positioned on the direction C sides of the spring receiving portions 361e (the direction B sides of the spring receiving portions 352c).

Also, as shown in FIG. 6, each spring receiving portion 361e of the stator 361 includes a support portion 361f positioned on the direction B side and a support portion 361g positioned on the direction C side. Also, each spring receiving portion 352c of the sun gear 352 includes a support portion 352e positioned on the direction B side and a support portion 352d positioned on the direction C side. Each support portion 361f of the stator 361 is opposed to any of the support portions 352d of the sun gear 352. Also, each support portion 361g of the stator 361 is opposed to any of the support portions 352e of the sun gear 352. Each one-side space 362a is provided between the support portion 361f and the support portion 352d which are paired and opposed to each other. Also, each other-side space 362b is provided between the support portion 361g and the support portion 352e which are paired and opposed to each other.

Also, the shock reduction mechanism 36 includes a plurality (for example, three) of compression coil springs 363 and a plurality (for example, three) of compression coil springs 364. Each compression coil spring 363 is an example of "a spring member" and "a first compression coil spring" according to a preferred embodiment of the present invention. Also, each compression coil spring 364 is an example of "a spring member" and "a second compression coil spring" according to a preferred embodiment of the present invention. The compression coil spring 363 and the compression coil spring 364 have spring constants different from each other.

The three compression coil springs 363 are arranged in the three one-side spaces 362a, respectively. Each compression coil spring 363 is engaged with the support portion 361f and the support portion 352d paired and opposed to each other while being elastically compressed. Each compression coil spring 363 is supported by the support portion 361f of the stator 361. Further, each compression coil spring 363 urges the support portion 352d of the sun gear 352 in the direction B.

Similarly, the three compression coil springs 364 are arranged in the three other-side spaces 362b, respectively. Each compression coil spring 364 is engaged with the support portion 361g and the support portion 352e paired and opposed to each other while being elastically compressed. Each compression coil spring 364 is supported by the support portion 361g of the stator 361. Further, each compression coil spring 364 urges the support portion 352e of the sun gear 352 in the direction C.

When a torque (shock) in the direction B is applied to the sun gear 352, the sun gear 352 is rotated in the direction B. At this time, the three compression coil springs 364 are compressed in the direction B and elastically deformed, respectively. Accordingly, the shock caused when the torque in the direction B was applied to the sun gear 352 is absorbed by the compression coil springs 364.

On the other hand, when a torque (shock) in the direction C is applied to the sun gear 352, the sun gear 352 is rotated in the direction C. Also, at this time, the three compression coil springs 363 are compressed in the direction C and elastically deformed, respectively. Accordingly, a shock caused when the torque in the direction C was applied to the sun gear 352 is absorbed by the compression coil springs 363.

Next, stopper portions 352f and 361h will be described in detail with reference to FIG. 6.

Each spring receiving portion 352c of the sun gear 352 includes a plurality (for example, two) of stopper portions 352f. The two stopper portions 352f provided on each spring receiving portion 352c extend in the direction B and the direction C along the outer peripheral portion 361b of the stator 361, respectively.

Also, each spring receiving portion 361e of the stator 361 includes a plurality (for example, two) of stopper portions 361h. The two stopper portions 361h provided on each spring receiving portion 361 extend in the direction B and the direction C along the outer peripheral portion 361b of the stator 361, respectively.

Each stopper portion 352f provided on the sun gear 352 is opposed to any of the stopper portions 361h provided on the stator 361. The stopper portion 352f and the stopper portion 361h opposed to each other are arranged to come into contact with each other when the rotation angle of the sun gear 352 reaches a predetermined value. Accordingly, the rotation angle of the sun gear 352 is limited to not more than the predetermined value.

Next, orifices 365a will be described with reference to FIG. 4 and FIG. 6.

The shock reduction mechanism 36 includes a disk-shaped lid member 365 covering an opening of the outer peripheral portion 361b of the stator 361, and a circlip 366 attached to the front end portion of the outer peripheral portion 361b of the stator 361. The lid member 365 is arranged on the inner side of the outer peripheral portion 361b of the stator 361 and perpendicular or substantially perpendicular to the central rotation axis L1 of the propeller shaft 32. A rear portion of the sun gear 352 is inserted through a through hole provided at the central portion of the lid member 365. The lid member 365 is arranged between the circlip 366 and the spring receiving portions 352c of the sun gear 352.

Also, the lid member 365 includes a plurality (for example, six) of orifices 365a. As shown by the phantom lines in FIG. 6, the six orifices 365a are arranged at even intervals in the circumferential direction. The six orifices 365a correspond to the six spaces 362, respectively. The six spaces 362 communicate with the exterior of the stator 361 via the six orifices 365a, respectively. The interior of the stator 361 including the six spaces 362 is filled with oil. Further, a space near the planetary gear mechanism 35 including the space near the lid member 365 is filled with oil. The six orifices 365a are arranged to allow oil stored in these spaces to flow therein.

When three compression coil springs 363 or the three compression coil springs 364 are compressed according to rotation of the sun gear 352, oil stored in the spaces accommodating the three springs to be compressed flows out of the stator 361 through any of the orifices 365a. Also, when the compressed three springs (three compression coil springs 363 or three compression coil springs 364) expand due to their restoring forces, oil outside the stator 361 flows into the spaces accommodating the three springs to expand through any of the orifices 365a. Therefore, when the sun gear 352 is rotated in the direction B or the direction C, the sun gear 352 receives resistance from oil.

Next, the oil passage 320b will be described in detail with reference to FIG. 3 and FIG. 4.

In the front end portion of the propeller shaft 32, the oil passage 320b is provided. The oil passage 320b includes a main passage 320c extending in the front/rear direction along the central rotation axis L1, and a front branched passage 320d and a rear branched passage 320e branched from the main passage 320c. The front branched passage 320d is arranged ahead of the rear branched passage 320e. The front branched passage 320d is provided at a position corresponding to the bearing 355 provided between the inner peripheral surface of the sun gear 352 and the outer peripheral surface of the propeller shaft 32.

The oil passage 320b is supplied with oil from the oil passage 343d provided in the rear end portion of the intermediate shaft 34. The oil supplied into the oil passage 320b is distributed to the front branched passage 320d and the rear branched passage 320e through the main passage 320c. The oil supplied into the front branched passage 320d is supplied to the planetary gear mechanism 35 and the shock reduction mechanism 36 via the bearing 355. Also, the oil supplied into the rear branched passage 320e is supplied to the bearing 320 which supports the propeller shaft 32 at the rear end portion of the lower case 303.

Next, a driving force transmission path from the drive shaft 31 to the propeller 33 of the outboard motor 3 will be described with reference to FIG. 2 and FIG. 4 to FIG. 6. First, a driving force transmission path when propelling the hull 2 forward will be described.

When propelling the hull 2 forward, the front dog 347a of the dog clutch 347 is engaged with the dog portion 341b of the front bevel gear 341. The crankshaft 30a is rotated in the direction A by a driving force of the engine 30. Also, the drive shaft 31 is rotated in the direction A according to rotation in the direction A of the crankshaft 30a.

According to the rotation in the direction A of the drive shaft 31, the bevel gear 310 attached to the vicinity of the lower end of the drive shaft 31 is rotated in the direction A. According to the rotation in the direction A of the bevel gear 310, the front bevel gear 341 is rotated in the direction B. On the other hand, according to the rotation in the direction A of the bevel gear 310, the rear bevel gear 342 is rotated in the direction C. The front dog 347a is engaged with the dog portion 341b of the front bevel gear 341, such that the rotation in the direction B of the front bevel gear 341 is transmitted to the intermediate shaft 343. Accordingly, the intermediate shaft 343 is rotated in the direction B.

Then, the rotation in the direction B of the intermediate shaft 343 is transmitted from the engagement portion 343f of the intermediate shaft 343 to the planetary gear mechanism 35. In detail, the engagement portion 343f of the intermediate shaft 343 and the ring gear 351 of the planetary gear mechanism 35 are engaged with each other, such that the ring gear 351 is rotated in the direction B. Accordingly, the six planetary gears 353 are rotated in the direction D1, respectively. Therefore, a torque in the direction C is applied to the sun gear 352 by the six planetary gears 353. Then, the torque in the direction C applied to the sun gear 352 is transmitted to the shock reduction mechanism 36.

According to the input of the torque in the direction C into the sun gear 352, the spring receiving portions 352c of the sun gear 352 are rotated in the direction C against reaction forces of the compression coil springs 363. Accordingly, the compression coil springs 363 are compressed and elastically deformed. On the other hand, the compression coil springs 364 expand due to restoring forces. Then, when the rotation angle of the sun gear 352 reaches a predetermined value, the stopper portions 352f of the sun gear 352 come into contact with the corresponding stopper portions 361h positioned on the direction C side of the stator 361.

Also, when the spring receiving portions 352c are rotated in the direction C, oil filled in the three spaces 362a accommodating the three compression coil springs 363 flows out of the stator 361 through any of the orifices 365a. On the other hand, oil outside the stator 361 flows into the spaces 362b accommodating the three compression coil springs 364 through any of the orifices 365a. Therefore, when the spring receiving portions 352c are rotated in the direction C, the spring receiving portions 352c receive resistance from oil. Also, according to compressions of the compression coil springs 363, the spring receiving portions 352c receive resistances from the compression coil springs 363. Accordingly, the torque applied to the sun gear 352 is absorbed. Therefore, the shock to be applied to the whole outboard motor 3 is reduced and minimized.

Then, according to the rotations in the direction D1 of the six planetary gears 353, the six planetary gears 353 are rotated in the direction E1 around the central rotation axis L1. Accordingly, the six shaft members 356 supporting the six planetary gears 353 are also rotated in the direction E1 around the central rotation axis L1. Therefore, the force of rotating in the direction E1 around the central rotation axis L1 is transmitted from the six shaft members 356 to the carrier 354. As a result, the carrier 354 is rotated in the direction B.

The carrier 354 is spline-fitted to the propeller shaft 32, such that the propeller shaft 32 is rotated in the direction B together with the carrier 354. Also, the propeller shaft 32 and the propeller 33 are arranged to rotate integrally, such that according to the rotation in the direction B of the propeller shaft 32, the propeller 33 is rotated in the direction B. Accordingly, a propulsion force to propel the hull 2 forward is generated. The rotation of the intermediate shaft 343 is decelerated in the process of transmission from the ring gear 351 to the carrier 354, such that the rotation speed of the propeller shaft 32 is slower than the rotation speed of the intermediate shaft 343.

Next, a driving force transmission path from the drive shaft 31 to the propeller 33 of the outboard motor 3 when propelling the hull 2 backward will be described with reference to FIG. 2 and FIG. 4 to FIG. 6.

When propelling the hull 2 backward, the rear dog 347b of the dog clutch 347 is engaged with the dog portion 342b of the rear bevel gear 342. The bevel gear 310 attached to the vicinity of the lower end portion of the drive shaft 31 is rotated in the direction A according to rotation in the direction A of the drive shaft 31 in a state in which the rear dog 347b of the dog clutch 347 is engaged with the dog portion 342b of the rear bevel gear 342. The front bevel gear 341 is rotated in the direction B according to the rotation in the direction A of the bevel gear 310. On the other hand, the rear bevel gear 342 is rotated in the direction C according to the rotation in the direction A of the bevel gear 310. The rear dog 347b of the dog clutch 347 is engaged with the dog portion 342b of the rear bevel gear 342, such that the rotation in the direction C of the rear bevel gear 342 is transmitted to the intermediate shaft 343. Accordingly, the intermediate shaft 343 is rotated in the direction C.

Next, the rotation in the direction C of the intermediate shaft 343 is transmitted to the planetary gear mechanism 35 from the engagement portion 343f of the intermediate shaft 343. In detail, the engagement portion 343f of the intermediate shaft 343 and the ring gear 351 of the planetary gear mechanism 35 are engaged with each other, such that the ring gear 351 is rotated in the direction C. Accordingly, the six planetary gears 353 are rotated in the direction D2, respectively. Therefore, a torque in the direction B is applied to the sun gear 352 by the six planetary gears 353. Then, the torque in the direction B applied to the sun gear 352 is transmitted to the shock reduction mechanism 36.

When the torque in the direction B is applied to the sun gear 352, the spring receiving portions 352c of the sun gear 352 are rotated in the direction B against reaction forces of the compression coil springs 364. Accordingly, the compression coil springs 364 are compressed and elastically deformed. On the other hand, the compression coil springs 363 expand due to restoring forces. Then, when the rotation angle of the sun gear 352 reaches a predetermined value, the stopper portions 352f of the sun gear 352 come into contact with the corresponding stopper portions 361h positioned on the direction B side of the stator 361.

Also, when the spring receiving portions 352c are rotated in the direction B, oil filled in the three spaces 362b accommodating the three compression coil springs 364 flows out of the stator 361 through any of the orifices 365a. On the other hand, oil outside the stator 361 flows into the spaces 362a accommodating the three compression coil springs 363 through any of the orifices 365a. Therefore, when the spring receiving portions 352c are rotated in the direction B, the spring receiving portions 352c receive resistance from oil. Also, according to compressions of the compression coil springs 364, the spring receiving portions 352c receive resistances from the compression coil springs 364. Accordingly, the torque to be applied to the sun gear 352 is absorbed. Therefore, a shock to be applied to the whole outboard motor 3 is reduced and minimized.

According to the rotations in the direction D2 of the six planetary gears 353, the six planetary gears 353 are rotated in the direction E2 around the central rotation axis L1. Accordingly, the six shaft members 356 supporting the six planetary gears 353 are also rotated in the direction E2 around the central rotation axis L1. Therefore, a force of rotating in the direction E2 around the central rotation axis L1 is transmitted to the carrier 354 from the six shaft members 356. As a result, the carrier 354 is rotated in the direction C.

The carrier 354 is spline-fitted to the propeller shaft 32, such that the propeller shaft 32 is rotated in the direction C together with the carrier 354. Also, the propeller shaft 32 and the propeller 33 are arranged to rotate integrally, such that according to the rotation in the direction C of the propeller shaft 32, the propeller 33 is rotated in the direction C. Accordingly, a propulsion force to propel the hull 2 backward is generated. The rotation of the intermediate shaft 343 is decelerated in the process of transmission from the ring gear 351 to the carrier 354, such that the rotation speed of the propeller shaft 32 is slower than the rotation speed of the intermediate shaft 343.

Next, technical effects and advantages of the outboard motor of the first preferred embodiment of the present invention will be exemplified, hereinafter.

In the present preferred embodiment, the shock reduction mechanism 36 including the compression coil springs 363 and 364 is preferably provided. The compression coil springs 363 and 364 are arranged to expand and contract in the rotational direction of the propeller shaft 32. Therefore, a shock (torque) in a rotational direction when a driving force is applied to the propeller shaft 32 from the forward-reverse switching mechanism 34 is directly absorbed by the compression coil springs 363 and 364. Accordingly, the shock is reduced and minimized by the shock reduction mechanism 36. Therefore, a mechanism which switches the direction of a force for absorbing the shock, such as teeth to slidably engage with each other, is not necessary. Therefore, the life of the shock reduction mechanism 36 can be extended.

Also, in the present preferred embodiment, the shock reduction mechanism 36 is preferably provided with compression coil springs 363 and 364. The compression coil springs 363 and 364 elastically deform to a much greater extent than rubber and resin. Therefore, the compression coil springs 363 and 364 have an expansion and contraction stroke longer than that of rubber and resin. Therefore, a shock in a rotational direction (the direction B or the direction C) when a driving force is applied to the propeller shaft 32 is softly absorbed according to contractions of the compression coil springs 363 or the compression coil springs 364.

Also, in the present preferred embodiment, the shock reduction mechanism 36 is preferably arranged to reduce and minimize the shock applied to the sun gear 352 of the planetary gear mechanism 35. The shock of the whole outboard motor 3 is easily reduced and minimized according to the reduction of the shock applied to the sun gear 352 of the planetary gear mechanism 35. Therefore, reduction of the shock of the whole outboard motor 3 is easy.

Also, in the present preferred embodiment, the shock reduction mechanism 36 preferably includes a plurality of pairs of stopper portions 352f and 361h. The stopper portions 352f and 361h which are paired and opposed to each other come into contact with each other when the rotation angle of the sun gear 352 reaches a predetermined value. Accordingly, rotation of the sun gear 352 is prevented. In other words, the sun gear 352 is prevented from rotating after the shock is absorbed by the compression coil springs 363 and 364. Accordingly, a driving force from the engine 30 is transmitted to the propeller 33 without being absorbed by the compression coil springs 363 and 364. Therefore, a high torque can be transmitted to the propeller 33.

Also, in the present preferred embodiment, the plurality of orifices 365a are preferably provided in the shock reduction mechanism 36. A portion of oil stored in the spaces 362 accommodating the compression coil springs 363 and 364 flows out through any of the orifices 365a when the compression coil springs 363 or 364 are compressed. Also, a portion of oil stored outside the spaces 362 flows into the spaces 362 through any of the orifices 365a when the compression coil springs 363 or 364 are expanded. Therefore, the compression coil springs 363 and 364 receive resistance (damping force) from the oil when expanding and contracting. Therefore, even when the compression coil springs 363 and 364 oscillate, the oscillations are damped by the damping force.

Also, in the present preferred embodiment, the sun gear 352 preferably includes the plurality of spring receiving portions 352c. The spring receiving portions 352 extend radially outward. Also, the spring receiving portions 352c support the compression coil springs 363 and 364. Therefore, when a torque in the direction B or the direction C is applied to the sun gear 352, the compression coil springs 363 or the compression coil springs 364 are compressed by the corresponding spring receiving portions 352c. Then, a force (reaction force from the compressed coil springs) in a direction opposite to the direction of the torque applied to the sun gear 352 is applied to the sun gear 352. Accordingly, the shock applied to the sun gear 352 is absorbed. Therefore, it is not necessary to provide a mechanism which switches the direction of a force for absorbing the shock.

Also, in the present preferred embodiment, each spring receiving portion 352c of the sun gear 352 includes a support portion 352e positioned on the direction B side and a support portion 352d positioned on the direction C side. Each support portion 352e supports one end portion (end portion on the direction B side) of the compression coil spring 64. Also, each support portion 352d supports one end portion (end portion on the direction B side) of the compression coil spring 363. Therefore, when the sun gear 352 is rotated in the direction B, the compression coil springs 364 are pushed and compressed by the corresponding support portions 352e. Also, when the sun gear 352 is rotated in the direction C, the compression coil springs 363 are pushed and compressed by the corresponding support portions 352d. Therefore, even when the sun gear 352 is rotated in either the direction B or the direction C, the shock applied to the sun gear 352 is absorbed.

Also, in the present preferred embodiment, the compression coil springs 363 and 364 have spring constants different from each other. Therefore, resonance of the compression coil springs 363 and 364 is prevented.

Second Preferred Embodiment

Next, an arrangement of an outboard motor of a second preferred embodiment of the present invention will be described with reference to FIG. 7 to FIG. 15. FWD in the figures indicates the forward drive direction, and BWD in the figures indicates the reverse drive direction. In FIG. 7 to FIG. 15, components equivalent to the components shown in FIG. 1 to FIG. 6 will be designated by the same reference numerals as in FIG. 1, etc., and description thereof will be omitted.

This second preferred embodiment is different from the first preferred embodiment described above mainly in that all spring members of the shock reduction mechanism are simultaneously compressed and a shock to be applied to the propeller shaft is reduced and minimized even when the shock in either rotational direction of the forward drive direction and the reverse drive direction is applied to the propeller shaft.

Figure 7:
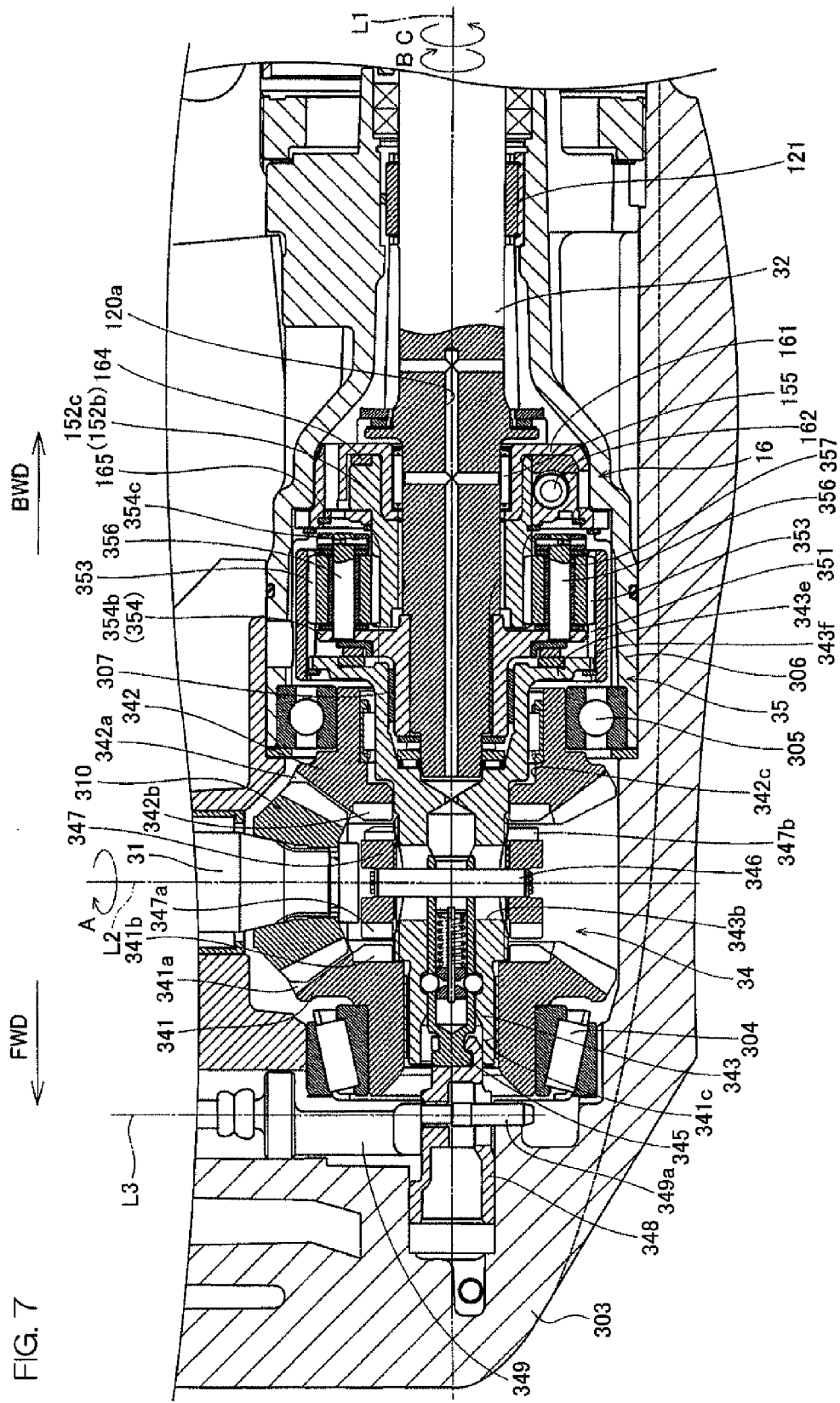
FIG. 7 is a sectional view for describing an arrangement inside a lower case of an outboard motor according to a second preferred embodiment of the present invention.

FIG. 7 is a sectional view for describing an arrangement inside a lower case of the outboard motor according to the second preferred embodiment of the present invention.

The shock reduction mechanism 16 is provided in the rear of the planetary gear 353. The shock reduction mechanism 16 is provided on a driving force transmission path from the intermediate shaft 343 to the propeller shaft 32. The shock reduction mechanism 16 reduces and minimizes a shock to be applied to the sun gear 152 (the planetary gear mechanism 35) even when the force to be applied to the sun gear 152 is either the direction B or the direction C.

Figure 8:
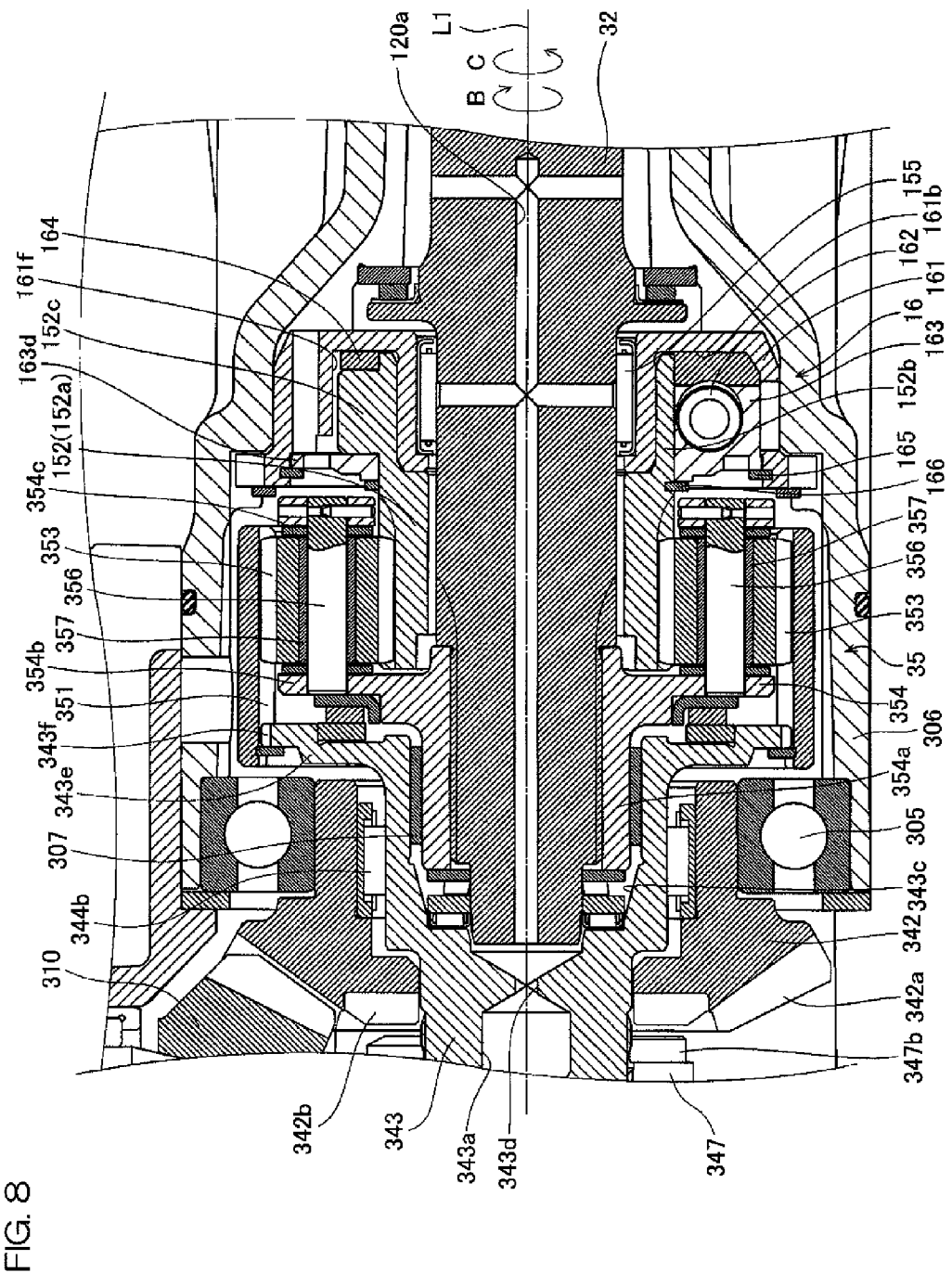
FIG. 8 is a sectional view for describing an arrangement of a shock reduction mechanism according to the second preferred embodiment of the present invention.
Figures 9, 10:
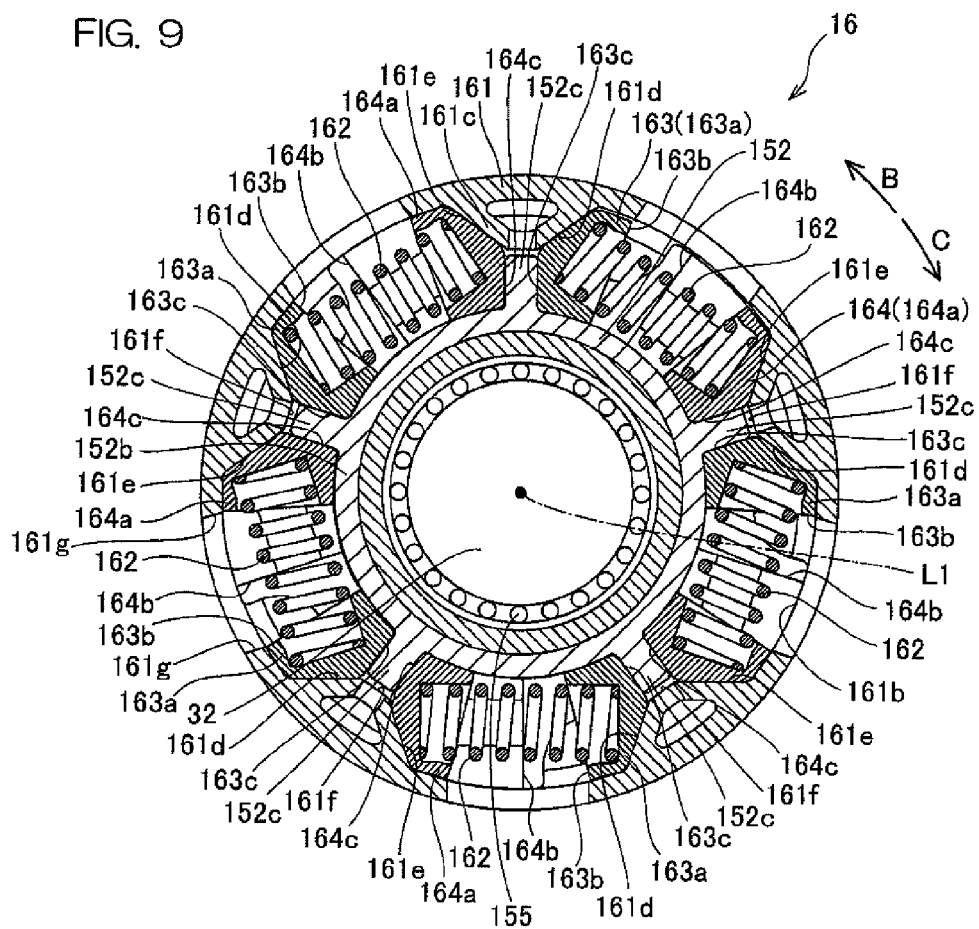
FIG. 9 is a sectional view for describing the arrangement of the shock reduction mechanism according to the second preferred embodiment of the present invention.
FIG. 10 is a front view for describing an arrangement of a housing of the shock reduction mechanism according to the second preferred embodiment of the present invention.

FIG. 8 and FIG. 9 are sectional views for describing an arrangement of the shock reduction mechanism according to the second preferred embodiment of the present invention.

The shock reduction mechanism 16 includes a cylindrical portion 152b, a housing 161, a plurality (for example, five) of spring members 162, a first housed member 164, and a second housed member 163. The cylindrical portion 152b is formed, for example, integrally with a gear portion 152a of the sun gear 152. The cylindrical portion 152b extends backward from the gear portion 152a of the sun gear 152. The sun gear 152 is arranged to be rotatable with respect to the housing 161. The sun gear 152 is an example of "a first relative rotation member" and "a rotating member" according to a preferred embodiment of the present invention. Also, the housing 161 is an example of "a second relative rotation member" and "a fixed member" according to a preferred embodiment of the present invention. The housing 161 houses the five spring members 162, the first housed member 164, and the second housed member 163. The first housed member 164 is an example of "a first housed member" according to a preferred embodiment of the present invention. Also, the second housed member 163 is an example of "a second housed member" according to a preferred embodiment of the present invention.

The housing 161 has, for example, a tubular shape. The housing 161 surrounds the propeller shaft 32 coaxially. The propeller shaft 32 is supported on the housing 161 via a bearing 155 arranged at the inner peripheral portion of the housing 161. As shown in FIG. 8, in a front portion of the propeller shaft 32, an oil passage 120a is provided. Oil supplied into the oil passage 120a is supplied to the planetary gear mechanism 35 and the shock reduction mechanism 16 via the bearing 155. Also, the oil supplied into the oil passage 120a is supplied to a bearing 121 (see FIG. 7) supporting the propeller shaft 32 in the rear portion of the lower case 303.

The spring members 162 are, for example, compression coil springs. Each spring member 162 is inserted into the inside of the housing 161 from any of spring insertion holes 161g provided in the outer peripheral portion of the housing 161. One side of each spring member 162 is supported on the second housed member 163 inside the housing 161. Also, the other side of each spring member 162 is supported on the first housed member 164 inside the housing 161. The first housed member 164 and the second housed member 163 are arranged to be rotatable in the direction B and the direction C with respect to the housing 161. The first housed member 164 and the second housed member 163 are arranged to approach each other according to relative rotations of the sun gear 152 and the housing 161.

Next, the housing 161 of the shock reduction mechanism 16 will be described with reference to FIG. 9 and FIG. 10.

FIG. 10 is a front view for describing an arrangement of the housing of the shock reduction mechanism according to the second preferred embodiment of the present invention.

The housing 161 of the shock reduction mechanism 16 includes a plurality of projections 161a (see FIG. 10) provided on the outer peripheral portion of the housing 161, an annular groove 161b opened in the arrow FWD direction, and a plurality (for example, five) of support portions 161c provided in the groove 161b. The projections 161a are engaged with the housing 306 (see FIG. 8). The housing 161 is prevented from rotating with respect to the housing 306 by the engagement of the projections 161a with the housing 306. Also, the cylindrical portion 152b of the sun gear 152, the first housed member 164, and the second housed member 163 are housed in the groove 161b of the housing 161.

Each support portion 161c projects toward the central rotation axis L1 from the outer peripheral portion of the housing 161. The five support portions 161c are arranged at even intervals in the circumferential direction. Also, each support portion 161c is arranged to have a mountain shape which becomes thinner as it goes to the inner side. Each support portion 161c includes a first slope surface 161e and a second slope surface 161d sloping oppositely to each other. Each first slope surface 161e supports the first housed member 164. Also, each second slope surface 161d supports the second housed member 163. Each support portion 161c prevents the second housed member 163 from moving in the direction B. Also, each support portion 161c prevents the first housed member 164 from moving in the direction C.

Next, the cylindrical portion 152b of the sun gear 152 will be described with reference to FIG. 9 and FIG. 11.

Figure 11:
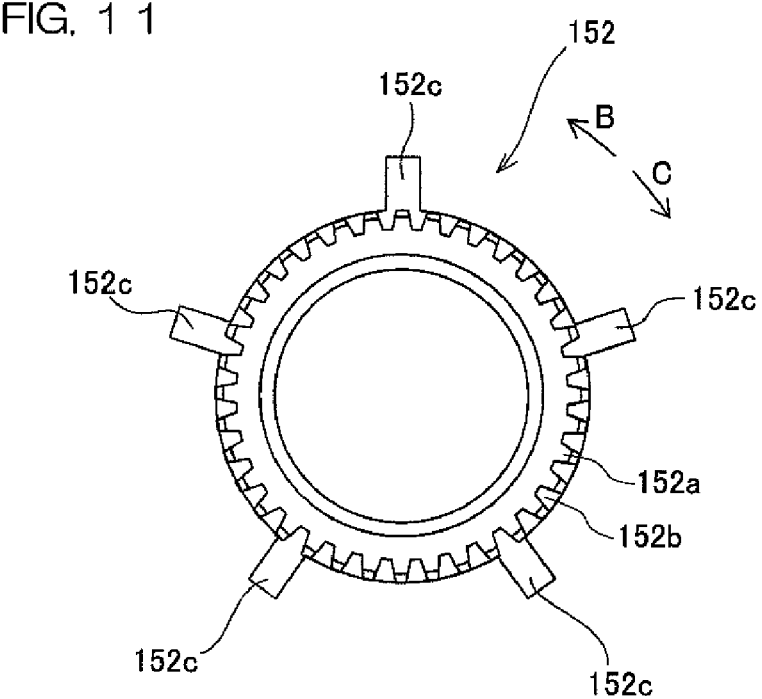
FIG. 11 is a front view for describing an arrangement of a sun gear according to the second preferred embodiment of the present invention.

FIG. 11 is a front view for describing an arrangement of the sun gear according to the second preferred embodiment of the present invention.

The cylindrical portion 152b of the sun gear 152 is arranged along the inner peripheral portion of the housing 161 inside the groove 161b. The cylindrical portion 152b of the sun gear 152 includes a plurality (for example, five) of projections 152c. The projections 152c extend radially outward from the cylindrical portion 152b. As shown in FIG. 9, in a state in which forces in the direction B and the direction C are not applied to the sun gear 152, the five projections 152c are opposed to apex portions 161f of the five support portions 161c provided on the housing 161. The projections 152c are arranged to press the first housed member 164 in the direction B when a force in the direction B is applied to the sun gear 152. Further, the projections 152c are arranged to press the second housed member 163 in the direction C when a force in the direction C is applied to the sun gear 152.

Next, the first housed member 164 of the shock reduction mechanism 16 will be described with reference to FIG. 9 and FIG. 12.

Figure 12:
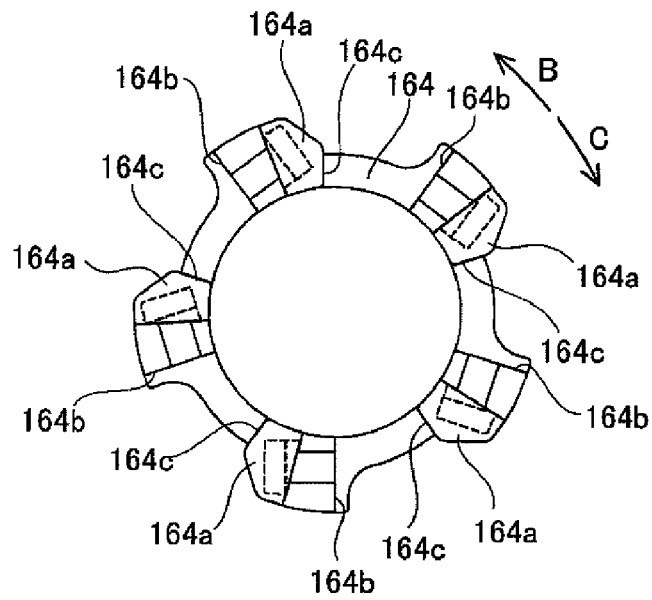
FIG. 12 is a front view for describing an arrangement of a first housed member of the shock reduction mechanism according to the second preferred embodiment of the present invention.

FIG. 12 is a front view for describing an arrangement of the first housed member of the shock reduction mechanism according to the second preferred embodiment of the present invention.

The first housed member 164 includes a plurality (for example, five) of first housed portions 164a, a plurality (for example, five) of stopper portions 164b, and a plurality (for example, five) of load receiving portions 164c. The five first housed portions 164a support the C direction sides of the five spring members 162. Also, the five stopper portions 164b are provided on the direction B side portions of the five first housed portions 164a. The stopper portions 164b have flat shapes. Also, the five load receiving portions 164c are provided on the direction C side portions of the five first housed portions 164a. The load receiving portions 164c are engaged with the projections 152c of the sun gear 152. When the sun gear 152 is rotated in the direction B, a load from the sun gear 152 is applied to the load receiving portions 164c.

Next, with reference to FIG. 8, FIG. 9, and FIG. 13, the second housed member 163 of the shock reduction mechanism 16 and components concerning this will be described.

Figure 13:
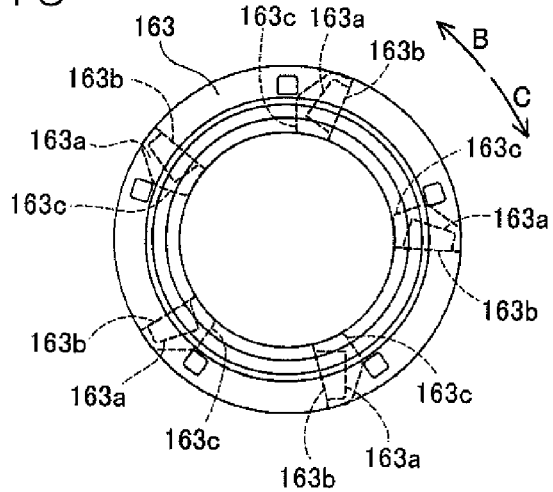
FIG. 13 is a front view for describing an arrangement of a second housed member of the shock reduction mechanism according to the second preferred embodiment of the present invention.

FIG. 13 is a front view for describing an arrangement of the second housed member of the shock reduction mechanism according to the second preferred embodiment of the present invention.

The second housed member 163 includes a plurality (for example, five) of second housed portions 163a, a plurality (for example, five) of stopper portions 163b, and a plurality (for example, five) of load receiving portions 163c. The five second housed portions 163a support the direction B sides of the five spring members 162. Also, the five stopper portions 163b are provided on the direction C side portions of the five second housed portions 163a. Each stopper portion 163b has a flat shape. Each stopper portion 163b is arranged to come into contact with a corresponding stopper portion 164b when the first housed portion 164a and the second housed portion 163a come closer to each other at a predetermined distance. Also, the five load receiving portions 163c are provided on the direction B side portions of the five second housed portions 163a. The load receiving portions 163c are engaged with the projections 152c of the sun gear 152. When the sun gear 152 is rotated in the direction C, a load from the sun gear 152 is applied to the load receiving portions 163c.

Each spring member 162 is supported by the first housed portion 164a of the first housed member 164 and the second housed portion 163a of the second housed member 163 while being elastically compressed. Each spring member 162 urges the corresponding first housed portion 164a and second housed portion 163a. When the first housed member 164 and the second housed member 163 are rotated relatively in the direction B or the direction C, the spring members 162 are sandwiched between the first housed portions 164a and the second housed portions 163a and elastically compressed.

Also, as shown in FIG. 8, inside the housing 161, a disk portion 163d is arranged. The disk portion 163d is arranged perpendicular or substantially perpendicular to the central rotation axis L1. A rear portion of the sun gear 152 is inserted through a through hole provided at the central portion of the disk portion 163d. The disk portion 163d covers the opening of the housing 161 from the arrow FWD direction side. The disk portion 163d is a portion on the arrow FWD direction side of the second housed member 163. The disk portion 163d is supported from the arrow FWD direction side by a circlip 165 attached to the inner peripheral surface of the groove 161b of the housing 161 and a circlip 166 attached to the outer peripheral surface of the cylindrical portion 152b of the sun gear 152.

Next, operations of the shock reduction mechanism when propelling the hull forward will be described with reference to FIG. 7 and FIG. 14.

When propelling the hull 2 (see FIG. 1) forward, the front dog 347a of the dog clutch 347 is engaged with the dog portion 341b of the front bevel gear 341. The crankshaft 30a (see FIG. 2) is rotated in the direction A by a driving force of the engine 30 (see FIG. 2). Also, the drive shaft 31 is rotated in the direction A according to the rotation in the direction A of the crankshaft 30a. Accordingly, the rotation in the direction A of the drive shaft 31 is applied to the front bevel gear 341 and the rear bevel gear 342.

In detail, according to the rotation in the direction A of the drive shaft 31, the bevel gear 310 attached to the vicinity of the lower end portion of the drive shaft 31 is rotated in the direction A. Then, according to the rotation in the direction A of the bevel gear 310, the front bevel gear 341 is rotated in the direction B. On the other hand, according to the rotation in the direction A of the bevel gear 310, the rear bevel gear 342 is rotated in the direction C. The front dog 347a of the dog clutch 347 is engaged with the dog portion 341b of the front bevel gear 341, such that the rotation in the direction B of the front bevel gear 341 is transmitted to the intermediate shaft 343. Accordingly, the intermediate shaft 343 is rotated in the direction B.

Then, the rotation in the direction B of the intermediate shaft 343 is transmitted from the engagement portion 343f of the intermediate shaft 343 to the planetary gear mechanism 35. In detail, the engagement portion 343f of the intermediate shaft 343 is engaged with the ring gear 351 of the planetary gear mechanism 35, such that the ring gear 351 is rotated in the direction B. Accordingly, the six planetary gears 353 are rotated in the direction D1 (see FIG. 5), respectively. Therefore, a torque in the direction C is applied to the sun gear 152 by the six planetary gear 353. Then, the torque in the direction C applied to the sun gear 152 is transmitted to the shock reduction mechanism 16. Accordingly, as shown in FIG. 14, the five projections 152c of the sun gear 152 are rotated in the direction C.

When the five projections 152c of the sun gear 152 are rotated in the direction C, the projections 152c press the load receiving portions 163c of the second housed member 163 in the direction C. Therefore, the second housed member 163 is rotated in the direction C, and the second housed portions 163a are moved in the direction C. Also, at this time, the first housed member 164 is prevented from rotating in the direction C by the first slope surfaces 161e of the support portions 161c. Therefore, the five spring members 162 are compressed in the direction C by the corresponding second housed portions 163a while being supported by the five first housed portions 164a. Accordingly, the shock applied to the sun gear 152 is reduced and minimized. Therefore, the shock to be applied to the whole outboard motor 3 is reduced and minimized.

Figure 14:
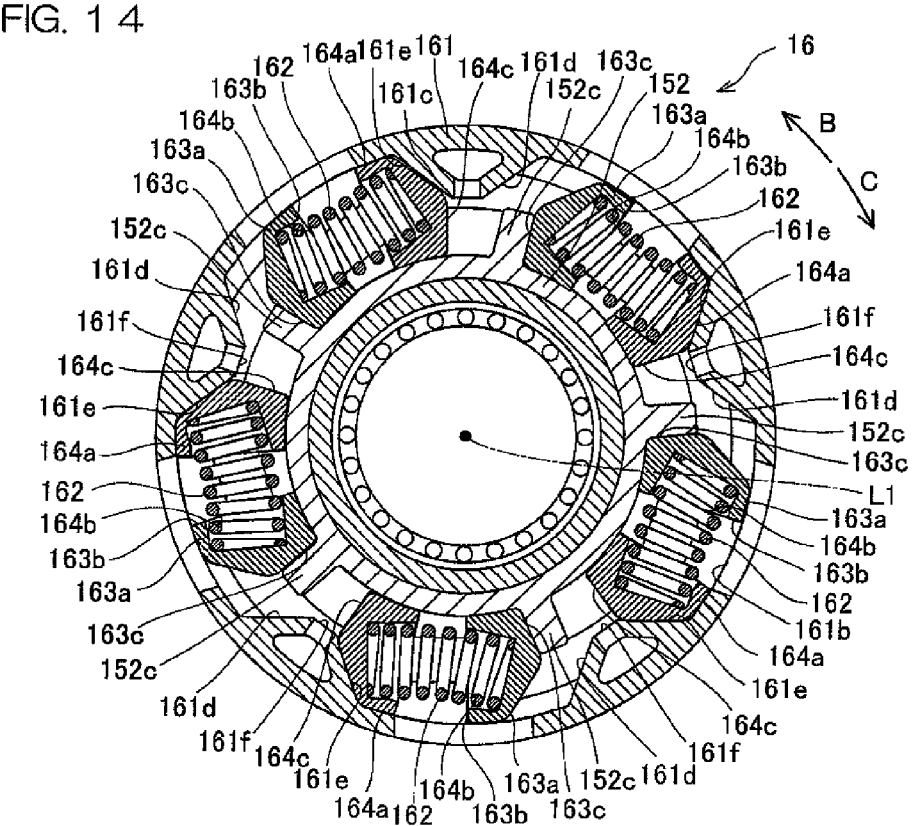
FIG. 14 is a sectional view for describing operations of the shock reduction mechanism according to the second preferred embodiment of the present invention.

Also, as shown in FIG. 14, when the rotating angle in the direction C of the second housed member 163 reaches a predetermined value, the stopper portions 163b provided on the second housed member 163 come into contact with the corresponding stopper portions 164b provided on the first housed member 164. Therefore, after the shock applied to the sun gear 152 is reduced and minimized by the spring members 162, the sun gear 152 is retained at a stable position.

Then, according to rotations in the direction D1 of the six planetary gears 353, the six planetary gears 353 are rotated in the direction E1 (see FIG. 5) around the central rotation axis L1. Accordingly, the six shaft members 356 supporting the six planetary gears 353 are also rotated in the direction E1 around the central rotation axis L1. Therefore, a force of rotating in the direction E1 around the central rotation axis L1 is transmitted from the six shaft members 356 to the carrier 354. As a result, the carrier 354 is rotated in the direction B.

The carrier 354 is preferably spline-fitted to the propeller shaft 32, such that the propeller shaft 32 is rotated in the direction B together with the carrier 354. Further, the propeller shaft 32 and the propeller 33 are arranged to rotate integrally, such that according to the rotation in the direction B of the propeller shaft 32, the propeller 33 is rotated in the direction B. Accordingly, a propulsion force to propel the hull 2 forward is generated. The rotation of the intermediate shaft 343 is decelerated in the process of transmission from the ring gear 351 to the carrier 354, such that the rotation speed of the propeller shaft 32 is slower than the rotation speed of the intermediate shaft 343.

Next, operations of the shock reduction mechanism when propelling the hull backward will be described with reference to FIG. 7 and FIG. 15.

Figure 15:
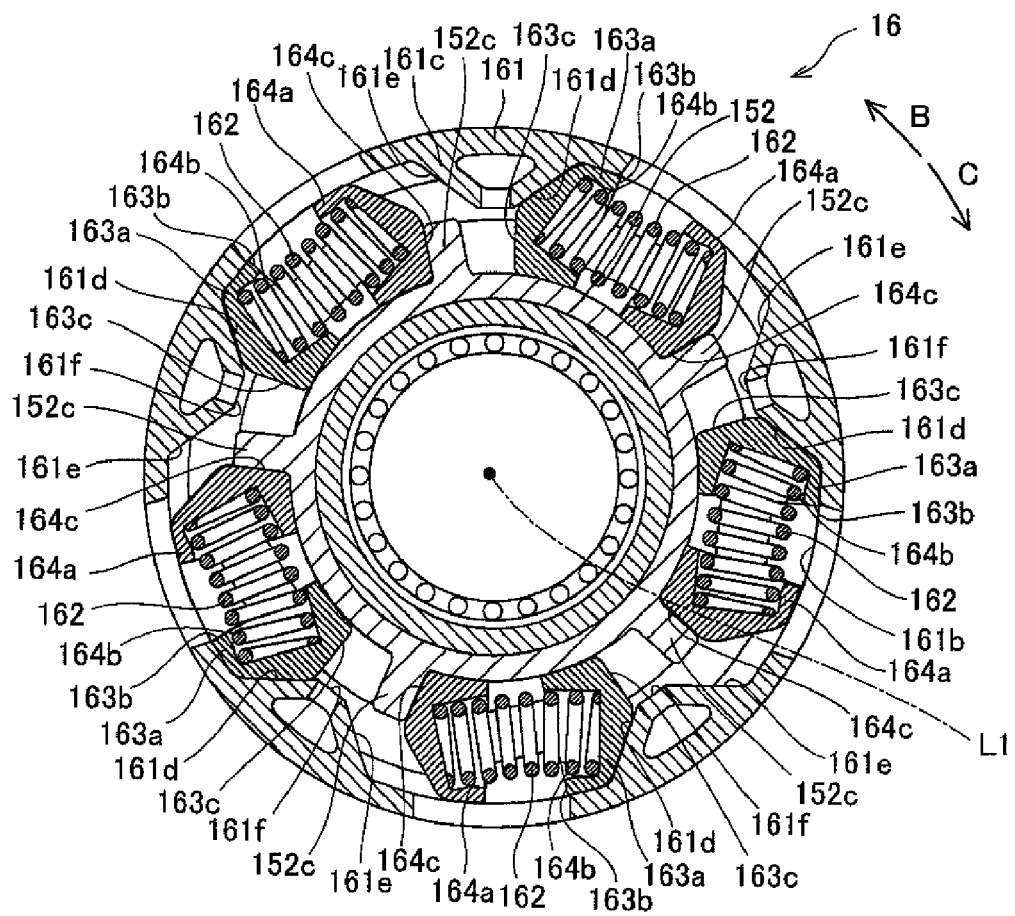
FIG. 15 is a sectional view for describing operations of the shock reduction mechanism according to the second preferred embodiment of the present invention.

FIG. 15 is a sectional view for describing operations of the shock reduction mechanism according to the second preferred embodiment of the present invention.

When propelling the hull 2 (see FIG. 1) backward, the rear dog 347b of the dog clutch 347 is engaged with the dog portion 342b of the rear bevel gear 342. The bevel gear 310 attached to the vicinity of the lower end portion of the drive shaft 31 is rotated in the direction A according to the rotation in the direction A of the drive shaft 31 in a state in which the rear dog 347b of the dog clutch 347 is engaged with the dog portion 342b of the rear bevel gear 342. The front bevel gear 341 is rotated in the direction B according to the rotation in the direction A of the bevel gear 310. On the other hand, the rear bevel gear 342 is rotated in the direction C according to the rotation in the direction A of the drive shaft 31. The rear dog 347b of the dog clutch 347 is engaged with the dog portion 342b of the rear bevel gear 342, such that the rotation in the direction C of the rear bevel gear 342 is transmitted to the intermediate shaft 343. Accordingly, the intermediate shaft 343 is rotated in the direction C.

Next, the rotation in the direction C of the intermediate shaft 343 is transmitted from the engagement portion 343f of the intermediate shaft 343 to the planetary gear mechanism 35. In detail, the ring gear 351 is rotated in the direction C. Accordingly, the six planetary gears 353 are rotated in the direction D2 (see FIG. 5). Therefore, a torque in the direction B is applied to the sun gear 152 from the six planetary gears 353. Then, the torque in the direction B applied to the sun gear 152 is transmitted to the shock reduction mechanism 16. Accordingly, as shown in FIG. 15, five projections 152c of the sun gear 152 are rotated in the direction B.

When the five projections 152c of the sun gear 152 are rotated in the direction B, the projections 152c press the load receiving portions 164c of the first housed member 164 in the direction B. Therefore, the first housed member 164 is rotated in the direction B, and the first housed portions 164a are moved in the direction B. Also, at this time, the second housed member 163 is prevented from rotating in the direction B by the second slope surfaces 161d of the support portions 161c. Therefore, the five spring members 162 are compressed in the direction B by the corresponding first housed portions 164a while being supported by the five second housed portions 163a. Accordingly, the shock applied to the sun gear 152 is reduced and minimized. Therefore, the shock to be applied to the whole outboard motor 3 is reduced and minimized.

Also, as shown in FIG. 15, when the rotation angle in the direction B of the first housed member 164 reaches a predetermined value, the stopper portions 164b provided on the first housed member 164 come into contact with the corresponding stopper portions 163b provided on the second housed member 163. Therefore, after the shock applied to the sun gear 152 is reduced and minimized by the spring members 162, the sun gear 152 is retained at a stable position.

Then, according to the rotations in the direction D2 of the six planetary gears 353, the six planetary gears 353 are rotated in the direction E2 (see FIG. 5) around the central rotation axis L1. Accordingly, the six shaft members 356 supporting the six planetary gears 353 are also rotated in the direction E2 around the central rotation axis L1. Therefore, a force of rotation in the direction E2 around the central rotation axis L1 is transmitted from the six shaft members 356 to the carrier 354. As a result, the carrier 354 is rotated in the direction C.

Then, according to the rotation in the direction C of the carrier 354, the propeller shaft 32 is rotated in the direction C together with the carrier 354. Also, the propeller shaft 32 and the propeller 32 are arranged to rotate integrally, such that according to the rotation in the direction C of the propeller shaft 32, the propeller 33 is rotated in the direction C. Accordingly, a propulsion force to propel the hull 2 backward is generated. The rotation of the intermediate shaft 343 is decelerated in the process of transmission from the ring gear 351 to the carrier 354, such that the rotation speed of the propeller shaft 32 is slower than the rotation speed of the intermediate shaft 343.

Next, technical effects and advantages of the outboard motor of the second preferred embodiment of the present invention will be exemplified hereinafter.

In the second preferred embodiment, five spring members 162 are preferably provided between the sun gear 152 and the housing 161. The spring members 162 are compressed even when a force in either the direction B or the direction C is applied to the sun gear 152. Therefore, a shock applied to the sun gear 152 is absorbed by the five spring members 162. Therefore, a shock when the sun gear 152 is rotated from a stopped state and a shock when the rotational direction of the sun gear 152 is switched to the reverse direction are absorbed by the five spring members 162. Accordingly, a mechanism which switches the direction of a force for absorbing a shock, such as teeth to slidably engage with each other, becomes unnecessary. Therefore, the life of the shock reduction mechanism 16 can be extended.

Also, in the second preferred embodiment, the first housed portions 164a of the first housed member 164 are arranged to rotate in the direction B and approach the second housed member 163 when a force in the direction B is applied to the sun gear 152. Also, the second housed portions 163a of the second housed member 163 are arranged to rotate in the direction C and approach the first housed member 164 when a force in the direction C is applied to the sun gear 152. Therefore, even when a force in either the direction B or the direction C is applied to the sun gear 152, the spring members 162 are compressed. Accordingly, a shock applied to the sun gear 152 is reliably absorbed by reaction forces of the spring members 162.

Also, in the second preferred embodiment, when the rotation angle in the direction C of the second housed member 163 reaches a predetermined value, the plurality of pairs of stopper portions 163b and 164b come into contact with each other. Simultaneously, when the rotation angle in the direction B of the first housed member 164 reaches the predetermined value, the plurality of pairs of stopper portions 163b and 164b come into contact with each other. Therefore, when the five spring members 162 absorb a shock, the compression amounts of the spring members 162 are limited to not more than a predetermined value. Accordingly, when the five spring members 162 absorb a shock, the compression amounts of the spring members 162 increase and can prevent the spring members 162 from being broken.

Also, in the second preferred embodiment, after the shock is reduced and minimized by the five spring members 162, the propeller shaft 32 is driven in the state in which the plurality of pairs of stopper portions 163b and 164b are in contact with each other. Therefore, the propeller shaft 32 is driven in a state in which relative positions in the circumferential direction of the first housed member 164 and the second housed member 163 are fixed. Accordingly, the propeller shaft 32 is stably rotated. Further, the propeller shaft 32 is driven in the state in which the pairs of stopper portions 163b and 164b are in contact with each other, such that a driving force from the engine 30 is transmitted to the propeller 33 without being absorbed by the spring members 162. Therefore, a high torque is transmitted to the propeller 33.

Also, in the second preferred embodiment, the housing 161 is preferably provided with five support portions 161c. The support portions 161c prevent the second housed member 163 from moving in the direction B when the first housed member 164 is pressed in the direction B by the sun gear 152. Also, the support portions 161c prevent the first housed member 164 from moving in the direction C when the second housed member 163 is pressed in the direction C by the sun gear 152. Accordingly, when a shock in either rotational direction is applied to the sun gear 152, the shock can be absorbed by the spring members 162 by compressing the spring members 162 by the first housed member 164 and the second housed member 163.

Third Preferred Embodiment

Figure 16:
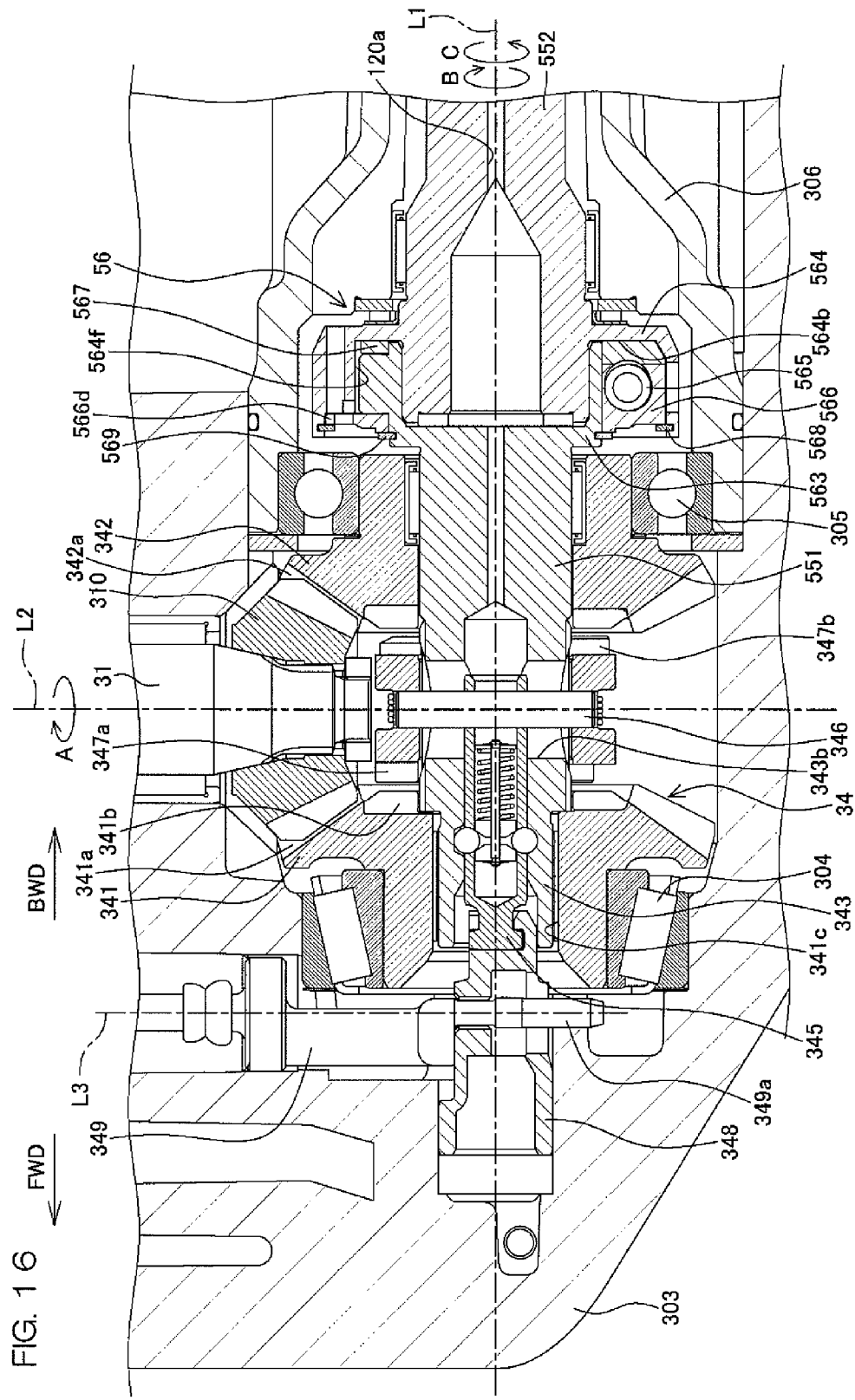
FIG. 16 is a sectional view for describing an arrangement inside a lower case of an outboard motor according to a third preferred embodiment of the present invention.
Figure 17:
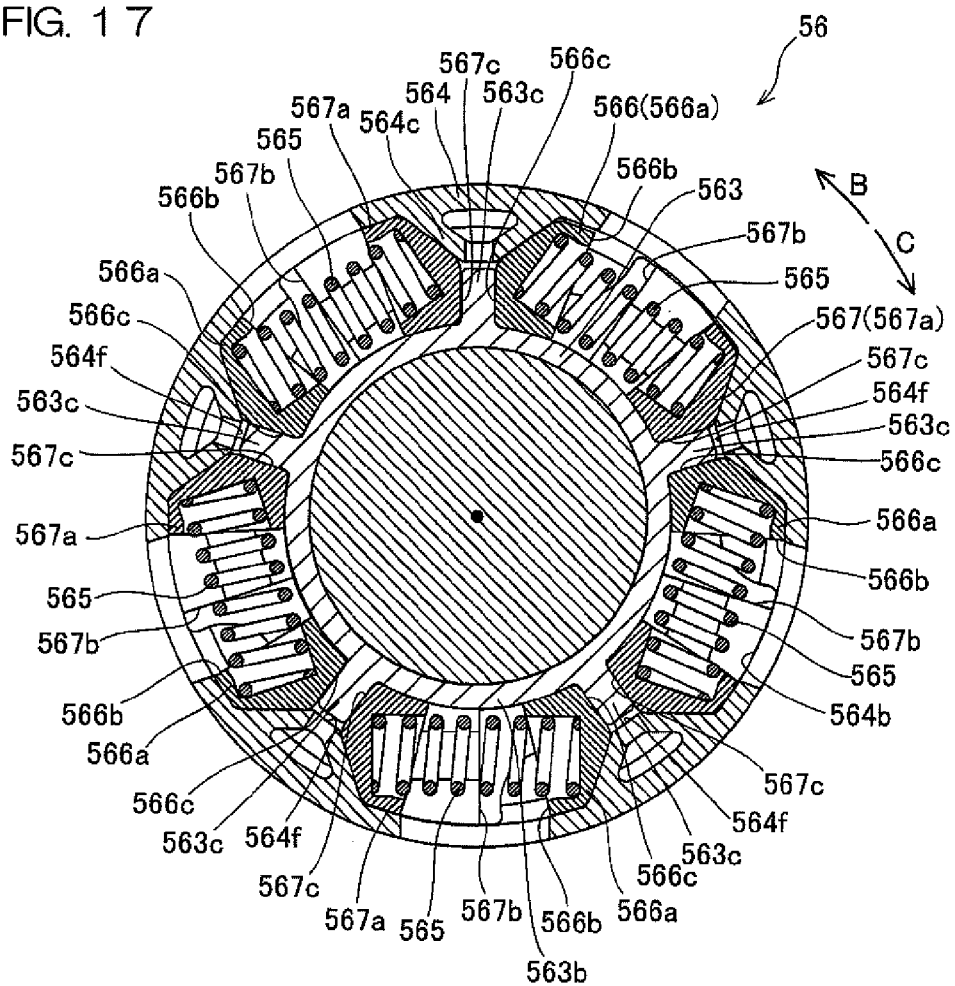
FIG. 17 is a sectional view for describing an arrangement of a shock reduction mechanism according to the third preferred embodiment of the present invention.

Next, an arrangement of an outboard motor of a third preferred embodiment of the present invention will be described with reference to FIG. 16 and FIG. 17. FWD in the figures indicates the forward drive direction, and BWD in the figures indicates the reverse drive direction. In FIG. 16 and FIG. 17, components equivalent to the components shown in FIG. 1 to FIG. 15 will be designated by the same reference numerals as in FIG. 1, etc., and description thereof will be omitted.

The present third preferred embodiment is different from the first preferred embodiment mainly in that the reduction gear mechanism (planetary gear mechanism) is not provided between the intermediate shaft and the propeller shaft, and the shock reduction mechanism is provided between the intermediate shaft and the propeller shaft.

FIG. 16 is a sectional view for describing an arrangement inside a lower case of the outboard motor according to the third preferred embodiment of the present invention. Also, FIG. 17 is a sectional view for describing an arrangement of a shock reduction mechanism according to the third preferred embodiment of the present invention.

The shock reduction mechanism 56 includes a first relative rotation member 563, a second relative rotation member 564, a plurality (for example, five) of spring members 565, a first housed member 566, and a second housed member 567. The first relative rotation member 563 is arranged to rotate integrally with the intermediate shaft 551. Also, the second relative rotation member 564 is arranged to rotate integrally with the propeller shaft 552. In detail, the first relative rotation member 563 is preferably integral with the rear end portion (end portion on the arrow BWD direction side) of the intermediate shaft 551. Also, the second relative rotation member 564 is preferably integral with the front end portion (end portion on the arrow FWD direction side) of the propeller shaft 552. The first relative rotation member 563 is an example of "a first rotating member" according to a preferred embodiment of the present invention. Also, the second relative rotation member 564 is an example of "a second rotating member" according to a preferred embodiment of the present invention.

The five spring members 565 are, for example, compression coil springs. The five spring members 565 are provided between the first relative rotation member 563 and the second relative rotation member 564. Also, the first housed member 566 and the second housed member 567 are housed in a groove 564b of the second relative rotation member 564. The first housed member 566 is arranged to support first sides of the spring members 565 inside the second relative rotation member 564. Also, the second housed member 567 is arranged to support second sides of the spring members 565 inside the second relative rotation member 564.

Next, the second relative rotation member 564 of the shock reduction mechanism 56 will be described with reference to FIG. 16 and FIG. 17.

The second relative rotation member 564 of the shock reduction mechanism 56 preferably has a tubular shape surrounding the central rotation axis L1 of the propeller shaft 552 coaxially. The second relative rotation member 564 includes an annular groove 564b opened in the arrow FWD direction and a plurality (for example, five) of support portions 564c provided in the groove 564b. The support portions 564c prevent the first housed member 566 from moving in the direction B. Also, the support portions 564c prevent the second housed member 567 from moving in the direction C. Therefore, the first housed member 566 is arranged to be rotatable in the direction C with respect to the second relative rotation member 564. Also, the second housed member 567 is arranged to be rotatable in the direction B with respect to the second relative rotation member 564.

Next, the first relative rotation member 563 of the shock reduction mechanism 56 and components concerning this will be described with reference to FIG. 16 and FIG. 17.

The first relative rotation member 563 of the shock reduction mechanism 56 includes a plurality (for example, five) of projections 563c. The five projections 563c extend radially outward, respectively. As shown in FIG. 17, in a state in which forces in the direction B and the direction C are not applied to the first relative rotation member 563, the five projections 563c are opposed to apex portions 564f of the five support portions 564c of the second relative rotation member 564, respectively. The projections 563c are arranged to press the second housed member 567 in the direction B when a force in the direction B is applied to the first relative rotation member 563. Also, the projections 563c are arranged to press the first housed member 566 in the direction C when a force in the direction C is applied to the first relative rotation member 563.

As shown in FIG. 16, inside the second relative rotation member 564, a disk portion 566d is provided. The disk portion 566d is arranged perpendicular or substantially perpendicular to the central rotation axis L1. The first relative rotation member 563 is inserted through a through hole provided at the central portion of the disk portion 566d. The disk portion 566d covers the opening of the second relative rotation member 564 from the arrow FWD direction side. The disk portion 566d is a portion on the arrow FWD direction side of the first housed member 566. The disk portion 566d is supported from the arrow FWD direction side by a circlip 568 attached to the inner peripheral surface of the groove 564b of the second relative rotation member 564, and a circlip 569 attached to the outer peripheral surface of the first relative rotation member 563.

Next, technical effects and advantages of the outboard motor of the third preferred embodiment of the present invention will be exemplified hereinafter.

In the third preferred embodiment, five spring members 565 are preferably provided between the first relative rotation member 563 and the second relative rotation member 564. The five spring members 565 are compressed even when a force in either the direction B or the direction C is applied to the first relative rotation member 563. Therefore, a shock applied to the first relative rotation member 563 is absorbed by the five spring members 565. Therefore, a shock when the first relative rotation member 563 is rotated from a stopped state and a shock when the rotational direction of the first relative rotation member 563 is switched to the reverse direction are absorbed by the five spring members 565. Accordingly, a mechanism which switches the direction of a force for absorbing a shock such as teeth to slidably engage with each other becomes unnecessary. Therefore, the life of the mechanism (shock reduction mechanism 56) which reduces and minimizes the shock can be extended.

Fourth Preferred Embodiment

Figure 18:
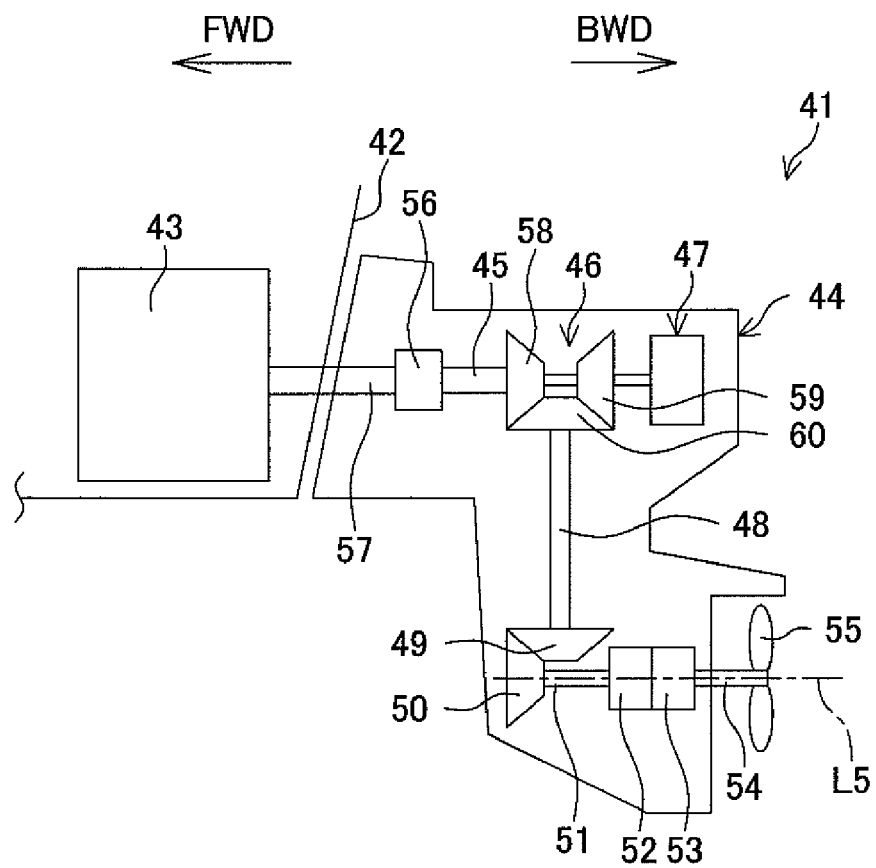
FIG. 18 is a schematic view for describing an arrangement of an inboard/outboard motor according to a fourth preferred embodiment of the present invention.

Next, an arrangement of an inboard/outboard motor of a fourth preferred embodiment of the present invention will be described with reference to FIG. 18. FWD in the figure indicates the forward drive direction, and BWD in the figure indicates the reverse drive direction. In FIG. 18, components equivalent to the components shown in FIG. 1 to FIG. 17 will be designated by the same reference numerals as in FIG. 1, etc., and description thereof will be omitted.

The present fourth preferred embodiment is different from the first to third preferred embodiments mainly in that the present invention is applied to an inboard/outboard motor as an example of a marine vessel propulsion unit.

FIG. 18 is a schematic view for describing an arrangement of the inboard/outboard motor according to the fourth preferred embodiment of the present invention.

The inboard/outboard motor 41 includes an engine 43 arranged inside a hull 42, and a drive unit 44 arranged outside the hull 42. The drive unit 44 includes an input shaft 45, a gear mechanism 46, a forward-reverse switching mechanism 47, and a drive shaft 48. Further, the drive unit 44 includes a drive gear 49, a driven gear 50, an intermediate shaft 51, a planetary gear mechanism 52, a shock reduction mechanism 53, a propeller shaft 54, and a propeller 55. One end portion of the input shaft 45 is joined to an output shaft 57 of the engine 43 via a universal joint 56.

The gear mechanism 46 includes a front bevel gear 58, a rear bevel gear 59, and a lower bevel gear 60. The front bevel gear 58 and the rear bevel gear 59 are arranged by being spaced from each other in the front/rear direction. The input shaft 45 is selectively joined to the front bevel gear 58 or the rear bevel gear 59 integrally rotatably by the forward-reverse switching mechanism 47. Also, the lower bevel gear 60 is arranged below the front bevel gear 58 and the rear bevel gear 59. The lower bevel gear 60 is engaged with the front bevel gear 58 and the rear bevel gear 59. The lower bevel gear 60 is joined to the upper end portion of the drive shaft 48.

Also, the drive gear 49 and the driven gear 50 are, for example, bevel gears. The drive gear 49 is joined to the lower end portion of the drive shaft 48. The driven gear 50 is engaged with the drive gear 49. The driven gear 50 is integrally joined to the intermediate shaft 51. The intermediate shaft 51 is joined to the propeller shaft 54 via the planetary gear mechanism 52 and the shock reduction mechanism 53.

The planetary gear mechanism 52 is an example of "a reduction gear mechanism" according to a preferred embodiment of the present invention. The planetary gear mechanism 52 is arranged on the central rotation axis L5 of the propeller shaft 54 between the intermediate shaft 51 and the propeller shaft 54. A detailed arrangement of the planetary gear mechanism 52 is similar to that of the planetary gear mechanism 35 described above. In this inboard/outboard motor 41, the planetary gear mechanism 52 may not be provided.

The shock reduction mechanism 53 is arranged on the central rotation axis L5 of the propeller shaft 54 between the planetary gear mechanism 52 and the propeller shaft 54. A detailed arrangement of the shock reduction mechanism 53 is similar to that of the shock reduction mechanism of any of the first to third preferred embodiments.

When propelling the hull 42 forward by the inboard/outboard motor 41, the input shaft 45 is joined to the front bevel gear 58 by the forward-reverse switching mechanism 47. Accordingly, rotation of the engine 43 is transmitted to the lower bevel gear 60 via the input shaft 45 and the front bevel gear 58. Therefore, the lower bevel gear 60 and the drive shaft 48 rotate integrally in a predetermined direction. Then, the rotation of the drive shaft 48 is transmitted to the intermediate shaft 51 via the drive gear 49 and the driven gear 50, and the rotation of the intermediate shaft 51 is transmitted to the propeller shaft 54 via the planetary gear mechanism 52 and the shock reduction mechanism 53. Accordingly, a driving force is transmitted to the propeller 55, and the propeller 55 is rotated in the predetermined direction.

On the other hand, when propelling the hull 42 backward by the inboard/outboard motor 41, the input shaft 45 is joined to the rear bevel gear 59 by the forward-reverse switching mechanism 47. Accordingly, rotation of the engine 43 is transmitted to the lower bevel gear 60 via the input shaft 45 and the rear bevel gear 59. Therefore, the lower bevel gear 60 and the drive shaft 48 rotate integrally in a direction opposite to the predetermined direction. Then, the rotation of the drive shaft 48 is transmitted to the intermediate shaft 51 via the drive gear 49 and the driven gear 50, and the rotation of the intermediate shaft 51 is transmitted to the propeller shaft 54 via the planetary gear mechanism 52 and the shock reduction mechanism 53. Accordingly, a driving force is transmitted to the propeller 55, and the propeller 55 rotates in the direction opposite to the predetermined direction.

Preferred embodiments of the present invention are described above, however, the present invention is not limited to the contents of the first to fourth preferred embodiments described above, but can be variously changed within the scope of the claims. For example, the first to third preferred embodiments show an example in which preferably two outboard motors as an example of a marine vessel propulsion unit are attached to a hull. However, the number of outboard motors may be 1 or 3 or more.

Also, the first and second preferred embodiments show an example in which the shock reduction mechanism is preferably arranged to reduce and minimize a shock to be applied to the sun gear of the planetary gear mechanism. However, the shock reduction mechanism may be arranged to reduce and minimize a shock applied to a gear such as the ring gear other than the sun gear. Also, the shock reduction mechanism maybe arranged to reduce and minimize a shock applied to a mechanism such as the forward-reverse switching mechanism other than the planetary gear mechanism.

Also, the first preferred embodiment shows an example in which preferably six spring members are provided. Also, the second and third preferred embodiments show an example in which preferably five spring members are provided. However, the number of spring members may be not more than 4 or not less than 7.

Also, the first preferred embodiment shows an example in which two types of compression coil springs with spring constants different from each other are provided in the shock reduction mechanism. However, it is also possible that only compression coil springs with spring constants equal to each other or substantially equal to each other are provided in the shock reduction mechanism of the first preferred embodiment. Also, it is also possible that three or more types of compression coil springs with spring constants different from each other are provided in the shock reduction mechanism of the first preferred embodiment. It is also possible that a plurality of types of compression coil springs with spring constants different from each other are provided in the shock reduction mechanisms of the second and third preferred embodiments.

Also, the first preferred embodiment shows an example in which the sun gear of the planetary gear mechanism is preferable arranged to be rotatable in a range of a predetermined angle via compression coil springs, and a driving force applied to the ring gear is output from the carrier. However, it is also possible that, for example, the ring gear of the planetary gear mechanism is arranged to be rotatable in a range of a predetermined angle via compression coil springs, and a driving force applied to the sun gear is output from the carrier.

Also, the first preferred embodiment shows an example in which the sun gear receives resistance from oil when the oil is made to flow in an orifice according to a rotation of the sun gear. However, it is also possible that, for example, a compression coil spring combined with an oil damper which applies resistance to the sun gear according to rotation of the sun gear is provided.

Also, the first to third preferred embodiments show an example in which preferably compression coil springs as an example of spring members are provided. However, the spring members may be elastic members such as leaf springs other than compression coil springs.

The present application corresponds to Japanese Patent Application No. 2008-297660 and Japanese Patent Application No. 2009-047785 filed on Nov. 21, 2008 and Mar. 2, 2009, respectively, to the Japan Patent Office, and whole disclosures of these applications are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel propulsion unit comprising:
   an engine;
   a drive shaft arranged to be rotated by the engine;
   a propeller shaft to which rotation of the drive shaft is transmitted;
   a propeller arranged to be rotated together with the propeller shaft;

an intermediate shaft arranged on a central rotation axis of the propeller shaft and to transmit rotation between the drive shaft and the propeller shaft;

a forward-reverse switching mechanism arranged to switch a rotational direction of the propeller shaft to a forward drive direction or a reverse drive direction; and a shock reduction mechanism including a plurality of spring members arranged to absorb a force in the rotational direction by elastically deforming in the rotational direction when the force in the rotational direction is applied to the intermediate shaft, and a pair of stopper portions arranged to prevent elastic deformations of the plurality of spring members by coming into contact with each other when the elastic deformation amounts of the plurality of spring members reach a predetermined value, the shock reduction mechanism being arranged on the central rotation axis of the propeller shaft; wherein the shock reduction mechanism further includes first and second relative rotation members arranged to rotate relatively in the rotational direction when the force in the rotational direction is applied to the intermediate shaft, and the plurality of spring members are arranged between the first and second relative rotation members and arranged to be compressed in the rotational direction according to relative rotations of the first and second relative rotation members; and the shock reduction mechanism further includes a first housed member housed in the second relative rotation member and arranged to support a first side of each of the spring members, and a second housed member housed in the second relative rotation member and arranged to support a second side of each of the spring members, the first and second housed members are arranged to approach each other according to relative rotations of the first and second relative rotation members, and each of the spring members is arranged to be compressed by the first and second housed members according to approaching of the first and second housed members to each other.

2. The marine vessel propulsion unit according to claim 1, wherein each of the spring members is arranged to absorb the force in the rotational direction whether the force in the rotational direction applied to the intermediate shaft is in a clockwise direction or in a counterclockwise direction.

3. The marine vessel propulsion unit according to claim 1, wherein the first relative rotation member includes a projection arranged to press the first housed member in one rotational direction when the first and second relative rotation members rotate relatively in the one rotational direction, and press the second housed member in the other rotational direction when the first and second relative rotation members rotate relatively in the other rotational direction, and the second relative rotation member includes a support portion arranged to support the first and second housed members so as to prevent rotation in the other rotational direction of the first housed member and rotation in the one rotational direction of the second housed member.

4. The marine vessel propulsion unit according to claim 1, wherein the plurality of spring members include compression coil springs.

5. A marine vessel propulsion unit comprising:
an engine;
a drive shaft arranged to be rotated by the engine;
a propeller shaft to which rotation of the drive shaft is transmitted;
a propeller arranged to be rotated together with the propeller shaft;
an intermediate shaft arranged on a central rotation axis of the propeller shaft and to transmit rotation between the drive shaft and the propeller shaft;
a forward-reverse switching mechanism arranged to switch a rotational direction of the propeller shaft to a forward drive direction or a reverse drive direction; and
a shock reduction mechanism including a plurality of spring members arranged to absorb a force in the rotational direction by elastically deforming in the rotational direction when the force in the rotational direction is applied to the intermediate shaft, and a pair of stopper portions arranged to prevent elastic deformations of the plurality of spring members by coming into contact with each other when the elastic deformation amounts of the plurality of spring members reach a predetermined value, the shock reduction mechanism being arranged on the central rotation axis of the propeller shaft; wherein
the shock reduction mechanism further includes first and second relative rotation members arranged to rotate relatively in the rotational direction when the force in the rotational direction is applied to the intermediate shaft, and the plurality of spring members are arranged between the first and second relative rotation members and arranged to be compressed in the rotational direction according to relative rotations of the first and second relative rotation members; and
the first relative rotation member includes a rotating member, and the second relative rotation member includes a fixed member that is prevented from rotating.

6. A marine vessel propulsion unit comprising:
an engine;
a drive shaft arranged to be rotated by the engine;
a propeller shaft to which rotation of the drive shaft is transmitted;
a propeller arranged to be rotated together with the propeller shaft;
an intermediate shaft arranged on a central rotation axis of the propeller shaft and to transmit rotation between the drive shaft and the propeller shaft;
a forward-reverse switching mechanism arranged to switch a rotational direction of the propeller shaft to a forward drive direction or a reverse drive direction; and
a shock reduction mechanism including a plurality of spring members arranged to absorb a force in the rotational direction by elastically deforming in the rotational direction when the force in the rotational direction is applied to the intermediate shaft, and a pair of stopper portions arranged to prevent elastic deformations of the plurality of spring members by coming into contact with each other when the elastic deformation amounts of the plurality of spring members reach a predetermined value, the shock reduction mechanism being arranged on the central rotation axis of the propeller shaft; wherein
the shock reduction mechanism further includes first and second relative rotation members arranged to rotate relatively in the rotational direction when the force in the rotational direction is applied to the intermediate shaft, and the plurality of spring members are arranged between the first and second relative rotation members and arranged to be compressed in the rotational direction according to relative rotations of the first and second relative rotation members; and the first relative rotation member includes a first rotating member integral with the intermediate shaft, and the second relative rotation member includes a second rotating member integral with the propeller shaft.

7. A marine vessel propulsion unit comprising:
an engine;
a drive shaft arranged to be rotated by the engine;
a propeller shaft to which rotation of the drive shaft is transmitted;
a propeller arranged to be rotated together with the propeller shaft;
an intermediate shaft arranged on a central rotation axis of the propeller shaft and to transmit rotation between the drive shaft and the propeller shaft;
a forward-reverse switching mechanism arranged to switch a rotational direction of the propeller shaft to a forward drive direction or a reverse drive direction;
a shock reduction mechanism including a plurality of spring members arranged to absorb a force in the rotational direction by elastically deforming in the rotational direction when the force in the rotational direction is applied to the intermediate shaft, and a pair of stopper portions arranged to prevent elastic deformations of the plurality of spring members by coming into contact with each other when the elastic deformation amounts of the plurality of spring members reach a predetermined value, the shock reduction mechanism being arranged on the central rotation axis of the propeller shaft; and
a reduction gear mechanism arranged on the central rotation axis of the propeller shaft, the reduction gear mechanism arranged to decelerate rotation of the intermediate shaft so as to transmit the decelerated rotation to the propeller shaft, wherein the reduction gear mechanism and the shock reduction mechanism are located between the intermediate shaft and the propeller shaft.

8. The marine vessel propulsion unit according to claim 7, wherein the reduction gear mechanism includes a planetary gear mechanism.

9. The marine vessel propulsion unit according to claim 8, wherein the planetary gear mechanism includes a sun gear, and the sun gear includes a spring receiving portion arranged to extend radially and support the spring members on one side and the other side of a circumferential direction of the sun gear.

10. The marine vessel propulsion unit according to claim 9, wherein the plurality of spring members include a first compression coil spring supported on one side of the spring receiving portion and a second compression coil spring supported on the other side of the spring receiving portion.

11. The marine vessel propulsion unit according to claim 10, wherein the first and second compression coil springs have spring constants different from each other.

12. A marine vessel propulsion unit comprising:
an engine;
a drive shaft arranged to be rotated by the engine;
a propeller shaft to which rotation of the drive shaft is transmitted;
a propeller arranged to be rotated together with the propeller shaft;
an intermediate shaft arranged on a central rotation axis of the propeller shaft and to transmit rotation between the drive shaft and the propeller shaft;
a forward-reverse switching mechanism arranged to switch a rotational direction of the propeller shaft to a forward drive direction or a reverse drive direction; and
a shock reduction mechanism including a plurality of spring members arranged to absorb a force in the rotational direction by elastically deforming in the rotational direction when the force in the rotational direction is applied to the intermediate shaft, and a pair of stopper portions arranged to prevent elastic deformations of the plurality of spring members by coming into contact with each other when the elastic deformation amounts of the plurality of spring members reach a predetermined value, the shock reduction mechanism being arranged on the central rotation axis of the propeller shaft; wherein
the shock reduction mechanism further includes an orifice arranged to cause oil in a space accommodating each of the spring members to flow out when each of the spring members is compressed, and to cause oil to flow into the space accommodating each of the spring members when each of the spring members is expanded.

13. The marine vessel propulsion unit according to claim 12, wherein the propeller shaft and the intermediate shaft include an oil passage arranged to supply oil to at least the orifice.

\* \* \* \* \*